United States Patent
Weiss et al.

(10) Patent No.: US 11,734,149 B2
(45) Date of Patent: Aug. 22, 2023

(54) TRACE-DATA PROCESSING DEVICE

(71) Applicant: ACCEMIC TECHNOLOGIES GMBH, Kiefersfelden (DE)

(72) Inventors: Alexander Weiss, Kiefersfelden (DE); Alexander Lange, Kiefersfelden (DE)

(73) Assignee: ACCEMIC TECHNOLOGIES GMBH, Kiefersfelden (DE)

( * ) Notice: Subject to any disclaimer, the term of this patent is extended or adjusted under 35 U.S.C. 154(b) by 308 days.

(21) Appl. No.: 17/017,963

(22) Filed: Sep. 11, 2020

(65) Prior Publication Data

US 2021/0081297 A1    Mar. 18, 2021

(30) Foreign Application Priority Data

Sep. 13, 2019 (EP) .................................. 19197351
Jan. 13, 2020 (EP) .................................. 20151511

(51) Int. Cl.
*G06F 9/44* (2018.01)
*G06F 11/34* (2006.01)
*G06F 9/30* (2018.01)
*G06F 11/273* (2006.01)
(Continued)

(52) U.S. Cl.
CPC ...... *G06F 11/3476* (2013.01); *G06F 9/30058* (2013.01); *G06F 9/30065* (2013.01); *G06F 11/2733* (2013.01); *G06F 11/323* (2013.01); *G06F 11/3636* (2013.01); *G06F 11/3648* (2013.01)

(58) Field of Classification Search
None
See application file for complete search history.

(56) References Cited

U.S. PATENT DOCUMENTS 6,351,844 B1 *   2/2002   Bala .................... G06F 11/3466
                                                    717/139
2007/0220362 A1 * 9/2007  Williams ................ G06F 11/28
                                                    714/E11.178

(Continued)

OTHER PUBLICATIONS

Decker et al. "Online Analysis of Debug Trace Data for Embedded Systems," 2018 Design, Automation & Test In Europe Conference & Exhibition, EDAA, Mar. 19, 2018, pp. 851-856.
(Continued)

*Primary Examiner* — Qamrun Nahar
(74) *Attorney, Agent, or Firm* — Sheridan Ross P.C.

(57) ABSTRACT

A trace-data-processing device for reconstructing an execution flow of a program performed by a source device under test or under observation, herein DUT, using at least one source-specific trace-data stream is disclosed. The trace-data-processing device comprises a trace-data-processing unit, which is configured to identify in the trace-data stream at least one instruction-synchronization message and branch messages. Moreover, the trace-data-processing device is configured to generate runtime-information data indicative of an at least partial reconstruction of the execution flow, using the identified trace messages, a pre-defined branch identifier allocated to each branch instruction address in the program that is associated with a direct branch instruction and pre-stored reconstruction information stored in a reconstruction memory.

15 Claims, 19 Drawing Sheets

(51) Int. Cl.
  *G06F 11/32*   (2006.01)
  *G06F 11/36*   (2006.01)

(56)       References Cited

U.S. PATENT DOCUMENTS

2010/0211828 A1*  8/2010  Moyer ................ G06F 11/3636
                                                  714/E11.203
2013/0219370 A1*  8/2013  Beale .................. G06F 11/3466
                                                  717/128
2016/0170820 A1*  6/2016  Strong ............... G06F 11/3636
                                                  714/37
2018/0276106 A1*  9/2018  Grant ................. G06F 11/3636
2019/0332520 A1* 10/2019  Myers ................ G06F 11/3466
2021/0049090 A1*  2/2021  Mola .................. G06F 11/3664

OTHER PUBLICATIONS

Decker et al. "Rapidly Adjustable Non-intrusive Online Monitoring for Multi-core-Systems," Pervasive: International Conference on Pervasive Computing, Nov. 11, 2017, pp. 179-196.
Extended Search Report for European Patent Application No. 20151511.1, dated Jul. 24, 2020, 11 pages.

* cited by examiner

TRACE-DATA PROCESSING DEVICE

CROSS-REFERENCE TO RELATED APPLICATIONS

This application claims the benefit of European Patent Application No. 19197351.0 filed 13 Sep. 2019, and European Patent Application No. 20151511.1 filed 13 Jan. 2020, the entire contents of each of which are incorporated herein by reference in their entireties.

FIELD

The present invention relates to a device and to a method for trace-data processing.

BACKGROUND

The progress and success of a software design project rely on tools for the analysis of the flow of program execution. A quick detection of defects in the software design is essential for achieving short development times.

Modern software design projects are often targeted at embedded processors, for instance in a System-on-a-Chip (SoC), and often times at multicore processor architectures. In such systems, there is a need to comprehensively monitor the program execution flow, for instance in order to be able to detect non-deterministic errors, which may occur in such systems with high probability, and to remove the defects causing such errors. For monitoring the program execution flow of embedded processors, embedded trace devices are used, which collect internal state information on the chip, filter it and provide a strongly compressed output containing the filtered state information.

Well-known embedded trace architectures for SoCs are known as the CoreSight architecture by ARM® Limited, as described in the references CoreSight™ Components—Technical Reference Manual—DDI 0314H. ARM, 2009, and CoreSight Technology System Design Guide, ARM Limited, 2010, and Embedded Trace Macrocell Architecture Specification, ARM Limited, 2016 and the Nexus standard, which is for instance used in Power Architecture® based microcontrollers designed by Freescale Semiconductor Inc. and described in detail in IEEE-ISTO, "The Nexus 5001 Forum—Standard for a Global Embedded Processor Debug Interface", IEEE-ISTO 5001TM-2012, June 2012.

To extract information about the flow of a program executed on a device under test or observation, hereinafter also referred to as DUT, a control flow reconstruction has to be performed based on a trace-data stream generated by the embedded trace device comprised in the DUT. However, in practical scenarios using multi-core SoC, the average bandwidth of the trace-data stream exceeds multiple Gbps.

In EP 2 873 983 A1, a trace-data processing device is disclosed that allows an online control flow reconstruction even for multi-core SoCs. The trace-data processing and profiling device comprises an input to receive source-specific trace-data streams comprising trace messages carrying execution-flow information on a program execution flow performed by a DUT. A trace-data processing unit derives from the trace-data stream runtime information associated with the program execution flow performed by the DUT. The trace-data processing unit comprises a message-distribution stage, a plurality of parallel message-processing stages, and a result consolidation stage connected with the message-processing stages. The message-distribution stage distributes the received trace data stream over the message-processing stages in the form of respective trace data sequences. The message-processing stages generate from the trace data sections runtime information sequences. The result-consolidation stage composes runtime information data representing an at least partial reconstruction of the program execution flow performed by the DUT.

SUMMARY

It is an object of the present invention trace-data processing device that achieves a comparable performance with increased processing speed.

The first aspect of the invention claims a trace-data-processing device for reconstructing an execution flow of a program performed by a source device under test or under observation, herein DUT, using at least one source-specific trace-data stream, wherein the trace-data processing device comprises a trace-data processing unit.

The trace-data processing unit is configured to identify in the trace-data stream
- at least one instruction-synchronization message indicative of an instruction address of an instruction executed by the DUT, and
- branch messages comprising information about an execution of a branch instruction by the DUT.

Moreover, the trace-data processing unit is configured to generate runtime-information data indicative of an at least partial reconstruction of the execution flow, using
- the identified at least one instruction-synchronization message and the identified branch messages,
- a pre-defined branch identifier allocated to each branch instruction address in the program that is associated with a direct branch instruction, wherein the branch identifiers are in an order corresponding to an execution direction of the program, and using
- pre-stored reconstruction information stored in a reconstruction memory, which includes address-allocation information and branch-identifier-allocation information.

The address-allocation information allocates a next branch identifier to each instruction address of the program, wherein the next branch identifier is that branch identifier whose branch instruction address is closest, in the execution direction, to an instruction address under consideration, or directly at the instruction address under consideration.

The branch-identifier-allocation information allocates to each branch identifier a subsequent branch identifier, wherein the subsequent branch identifier is that branch identifier whose branch instruction address is closest, in the execution direction, to a jump-in address associated with a branch instruction of a branch identifier under consideration, or is directly at the jump-in address.

Furthermore, to generate the runtime-information data, the trace-data-processing unit is configured, upon identification of the synchronization message, to store as an intermediate runtime information that next branch identifier which corresponds to the instruction address comprised by the synchronization message according to the address-allocation information.

Furthermore, to generate the runtime-information data, the trace-data-processing unit is configured, upon identification of a given branch message that indicates that a direct branch instruction was executed,
  (i) to include into the runtime information data the branch identifier stored as the intermediate runtime information, and (ii) to subsequently overwrite the intermediate runtime information with that subsequent branch identifier which is allocated to the stored branch identifier according to the branch-identifier-allocation information.

Moreover, to generate the runtime-information data, the trace-data-processing unit is configured, upon identification of a given branch message that indicates that a branch instruction was not executed, to update the intermediate runtime information by adding a predetermined increment to the value of the intermediate runtime information.

The invention recognizes that in the approach described in EP 2 873 983 A1, the execution flow of the program is reconstructed based on trace data on execution or non-execution of branch instructions comprised in the program and executed by the DUT. Moreover, for every executed and non-executed branch instruction or groups of branch instructions, the trace-data-processing device described in EP 2 873 983 A1 performs a read operation to a memory to access pre-stored reconstruction information.

According to the invention, a reduction in the number of required memory accesses is achieved using pre-defined branch identifiers, which uniquely identify the direct branch instruction in the program, wherein the branch identifiers are assigned in an order corresponding to the execution direction of the program. As a consequence of the order, upon reception of a branch message indicating non-execution of a branch instruction, the trace-data-processing unit is configured to determine the branch identifier of that branch instruction which will be encountered next during the execution of the program by adding a predetermined increment to the branch identifier of the branch instruction that was not executed by the DUT. Thus, the trace-data-processing device achieves an execution flow reconstruction performing memory access for obtaining reconstruction information pertaining to executed direct branch instructions only, and not to other instructions.

The predetermined increment used by the trace-data-processing device to update the intermediate runtime information can also be of negative value, depending on the order in which the branch identifiers are assigned to the branch instructions comprised in the program.

More generally, the invention recognizes that branch instructions are the only instructions that can change the execution flow in comparison with a fully linear execution of instructions according to their order in the program. The simplest case of application is formed by a program that only comprises branch instructions in the form of direct branch instructions. Direct branch instructions are executed more efficiently than indirect branch instructions. As a result, optimization procedures of compilers exist that aim at utilizing only direct branch instructions in a program. This is the application case underlying the claimed trace-data-processing device. As will be described further below, advantageous embodiments of the trace-data-processing device of the present invention allow further application also to DUT architectures that additionally support indirect branch instructions in addition to direct branch instructions, and in which the concept of using branch identifiers is extended to indirect branch instructions.

Therefore, the invention achieves a decrease of the required number of random memory accesses to increase the speed of the reconstruction of the execution flow and also the power consumption caused by memory accesses, as a result, to minimize the need to parallelize the reconstruction of the execution flow.

Furthermore, due to the increased speed of the reconstruction, the trace-data-processing unit allows an online reconstruction of the execution flow for most SoCs using a reduced number of parallel processes in comparison to the known devices of the state of the art. This is advantageous for reducing hardware costs. Moreover, the claimed trace-data-processing device also allows a reconstruction of the execution flow of embedded trace architectures, which do not guarantee the frequent output of synchronization messages, which are required to split the trace-data stream into parts that can be processed in parallel. One example of such an architecture which does not guarantee the frequent output of synchronization messages within the trace-data stream is the NXP QorIQ processor series, based on the Power architecture.

Moreover, due to the increased speed of the reconstruction, a trace-data-processing device that uses the same number of parallel processes to perform the execution flow reconstruction as a comparable device of the state of the art, performs the execution flow reconstruction faster and has a lower energy consumption due to the reduced number of memory accesses.

In the following, preferred embodiments of the trace-data-processing device will be described.

In another embodiment of the trace-data-processing device, the trace-data-processing unit is configured to generate runtime-information data using the pre-defined branch identifiers, wherein a predefined branch identifier is also allocated to those branch instruction addresses in the program that are associated with an indirect branch instruction.

Additionally, the trace-data-processing unit is configured, upon identification of a branch message that indicates that an indirect branch instruction was executed,
  (i) to include into the runtime information data the branch identifier stored as the intermediate runtime information, and
  (ii) to subsequently overwrite the intermediate runtime information with that next branch identifier which is allocated to the jump-in address indicated by the branch message according to the address allocation.

This embodiment is advantageous for the reconstruction of the execution flow of the program run by the DUT, whose application object code also uses indirect branch instructions.

The branch identifiers that correspond to indirect branch instructions are included into the address-allocation information. However, due to the undetermined jump-in address, a subsequent branch identifier cannot be allocated to those branch identifiers that correspond to indirect branch instructions. Therefore, in variants of the described embodiment, the branch identifiers corresponding to indirect branch instructions are included into the branch-identifier-allocation information, wherein the subsequent branch identifier is marked as an indirect branch. Including and marking the indirect branch instructions in the branch-identifier-allocation information is advantageous to validate the control flow reconstruction process, since attention can be paid at this point to the receipt of an indirect branch instruction message. In other variants, the branch identifiers corresponding to indirect branch instructions are not included into the branch-identifier-allocation information.

In a variant of this embodiment, the trace-data-processing unit is configured to store the instruction address last updated through either an instruction-synchronization message or a branch message indicating the execution of an indirect branch instruction.

This variant is particularly advantageous for those trace architectures that only provide in an indirect branch message those bits of the jump-in instruction address that have changed to the last instruction address transmitted by an instruction synchronization or branch message. Examples of such architectures are the PowerPC and the ARM® CoreSight architecture.

In another embodiment of the trace-data-processing device, the trace-data-processing unit is configured, upon reception of a branch message that indicates that a branch instruction was not executed, to include into the runtime information data the branch identifier stored as the intermediate runtime information.

This embodiment is particularly advantageous for those scenarios in which an exception occurs that leads to a change of the program flow through the dynamic insertion of an indirect branch. In those scenarios, branch identifiers comprised in the runtime-information data corresponding to non-executed branch instructions can be used to identify in which sequential region of instructions the exception occurred.

In variants of this embodiment, the trace-data-processing unit is configured to use pre-defined marks that distinguish those branch identifiers corresponding to executed branch instructions from those branch identifiers corresponding to non-executed branch instructions when including branch identifiers into the runtime-information data.

In yet another embodiment of the trace-data-processing device, the trace-data-processing unit is configured, upon reception of a branch message, to include into the runtime information a time information associated with the processing of the branch message by the trace-data-processing unit.

This embodiment is particularly advantageous for those scenarios in which it is not only important to reconstruct the execution flow of the program, but also to identify a time information when a given branch instruction was executed. A non-limiting example of such a scenario is the situation when an analysis requires a merging of multiple reconstructed execution flows each corresponding to a different CPU of a multicore DUT.

In variants of this embodiment, the included time information corresponds to a cycle count that is included in the trace messages of some trace architectures. Examples for architectures that include the cycle count into trace messages are the ARM® ETMv3, the ARM® PFT and the ARM® ETMv4.

In another variant of this embodiment, the included time information corresponds to a time stamp of a timestamp message generated by the DUT and included into the trace-data stream. Depending on the architecture of the DUT, the timestamp may either be a CPU-specific cycle count or a timestamp corresponding to a processor wide "wall clock".

In yet another variant of this embodiment, the trace-data-processing device is configured to assign a reception timestamp to at least the branch messages, wherein the reception timestamp is indicative of the time that the trace-data-processing device received the respective trace message.

In yet a different embodiment of the trace-data-processing device, the trace-data-processing unit is configured to output the jump-in address of the branch instruction of the stored branch identifier, upon reception of a branch message indicating that a branch instruction was executed.

This embodiment is particularly advantageous for trace architectures that use indirect branch instructions, for which the jump-in address is determined during runtime.

In yet another embodiment of the trace-data-processing device, the branch-identifier-allocation information, which includes marks for distinguishing those of the branch identifiers which are to be included into the runtime information data from those of the branch identifiers which are not to be included into the runtime information data.

Moreover, in this embodiment, the trace-data-processing unit is configured, upon identification of a branch message that indicates execution or non-execution of a branch instruction, to include into the runtime information data only those branch identifiers stored in the intermediate runtime information that are marked for inclusion into the runtime information data.

This embodiment is particularly advantageous for those scenarios where an analysis of a reconstructed execution flow is only necessary for one or more selected parts of the program.

In one variant of this embodiment, the marks tag those branch identifiers that are to be included into the runtime information data. In another variant, the marks tag those branch identifiers which are to be excluded from the runtime information data.

In another embodiment of the trace-data-processing unit, the branch-identifier-allocation information additionally allocates to a branch identifier under consideration for each sequence of a set of sequences of execution information elements a series branch identifier.

The execution information elements, which comprise the sequence of execution information elements, are indicative of execution or non-execution of corresponding direct branch instructions, the sequences starting from the branch identifier under consideration and ending at a respective final branch identifier.

Furthermore, the set of sequences includes at least those sequences, up to a given length, whose first and last execution information element in the sequence indicate execution of the corresponding branch instruction.

Furthermore, the series branch identifier is that branch identifier whose branch instruction address is closest to, in the execution direction, or directly at the jump-in address of the final branch identifier.

Additionally, the trace-data-processing unit is configured, upon identification of a sequence of branch messages indicative of execution or non-execution of direct branch instructions, to include into the runtime information, using the branch-identifier-allocation information, those branch identifiers whose direct branch instructions were executed by the DUT.

This embodiment is particular advantageous since it only requires for a given sequence of branch messages indicating execution or non-execution of direct branch messages a single read access to the branch-identifier-allocation information.

In a variant of the described embodiment of the trace-data-processing unit, which is configured to generate the runtime-information data using pre-defined branch identifier allocated also to indirect branch instruction addresses, the set of sequences of execution information elements also includes sequences comprising execution information elements indicative of non-execution of indirect branch instructions.

This variant is particularly advantageous to reduce the number of read accesses to the reconstruction memory also for those cases in which runtime-information data is generated from trace data including branch messages indicative of execution and non-execution of indirect branch instructions.

In another variant, the set of sequences includes only those sequences, up to a given length, whose first and last execution information element in the sequence indicate execution of the corresponding branch instruction. In this variant, the trace-data-processing unit is configured to separately process leading and trailing execution information elements of a sequence, which indicate non-execution of branch instruction.

This variant is particularly advantageous, since it reduces the number of required sequences included in the set and as a result the memory required to store the set.

In yet another embodiment of the trace-data-processing device, the trace-data-processing unit is configured to generate the runtime-information data additionally using instruction-observation-point identifiers.

Instruction-observation-point identifiers, herein IOP identifiers, are pre-allocated to those instruction addresses in the program whose execution is to be monitored by the trace-data-processing unit.

Furthermore, the address-allocation information additionally allocates a next IOP identifier to each instruction address, wherein the next IOP identifier is that IOP identifier, if any, whose instruction address is located closest to or directly at an instruction address under consideration and whose instruction address is located in an interval between the instruction address under consideration and a branch instruction address located closest to the instruction address under consideration, in the execution direction.

Furthermore, the branch-identifier-allocation information additionally allocates to each branch identifier a first subsequent IOP identifier, which is that IOP identifier, if any, whose instruction address is located closest to or directly at a branch instruction address of the branch identifier under consideration and whose instruction address is located in an interval between the branch instruction address of the branch identifier under consideration and a branch instruction address located closest to the branch instruction address of the branch identifier under consideration, in the execution direction.

Additionally, the branch-identifier-allocation information additionally allocates to each branch identifier a second subsequent IOP identifier, which is that IOP identifier, if any, whose instruction address is located closest to or directly at a jump-in address of the branch identifier under consideration and whose instruction address is located in an interval between the jump-in address of the branch identifier under consideration and a branch instruction address located closest to the jump-in address of the branch identifier under consideration, in the execution direction.

Moreover, the pre-stored reconstruction information additionally includes IOP-allocation information that indicates for a given IOP identifier any following IOP identifier, whose instruction address is located in an interval between the instruction address of the IOP identifier under consideration and a branch instruction address located closest to the instruction address of the IOP identifier under consideration, in the execution direction.

Additionally, the trace-data-processing unit is configured, upon identification of an instruction-synchronization message, to determine, using the address-allocation information and the IOP-allocation information, those IOP identifiers, if any, whose associated instructions are to be executed by the DUT before execution or non-execution of a next branch instruction in the program execution flow, and to include the determined IOP identifiers into the intermediate runtime information.

Moreover, the trace-data-processing device is configured, upon reception of a branch message indicating execution or non-execution of a direct branch instruction, to include into the runtime information data any IOP identifier comprised in the intermediate runtime information and to determine, using the branch-identifier allocation and the IOP allocation, those IOP identifiers, if any, before execution or non-execution of a next branch instruction in the program execution flow, and to include the determined IOP identifiers into the intermediate runtime information.

This embodiment is particularly advantageous for those cases which require a monitoring of an instruction that is not a branch instruction. A non-limiting example for such a case is the monitoring of an instruction that performs a memory access and the question if the memory access has been performed before an exception during the program execution occurred.

In yet another embodiment, the trace-data-processing unit is configured to generate runtime-information data using series branch identifiers and IOP identifiers. In this embodiment, the branch-identifier allocation information additionally allocates to a branch identifier under consideration for each sequence of a set of sequences of execution information elements a series IOP identifier.

The execution information elements are indicative of execution or non-execution of a corresponding direct branch instructions, starting from the branch identifier under consideration and ending at a respective final branch identifier.

Moreover, the series IOP identifier is that IOP identifier whose instruction address,
(i) in case of execution of the branch instruction of the final branch identifier, is located closest to, in the execution direction, or directly at a jump-in address of the branch instruction of the final branch identifier, and is located in an interval between the jump-in address and a branch instruction address located closest to the jump-in address of the final branch identifier in the execution direction; and
(ii) in case of non-execution of the branch instruction of the final branch identifier, is located closest to in the execution direction or directly at the branch instruction address of the final branch identifier, and is located in an interval between the branch instruction address of the final branch identifier and a branch instruction address located closest to the branch instruction address of the final branch identifier in the execution direction.

Moreover, the trace-data-processing unit is configured, upon identification of a sequence of branch messages indicative of execution or non-execution of direct branch instructions, to include into the runtime information, using the branch-identifier allocation and the IOP-identifier allocation and the IOP-allocation information, those IOP identifiers whose instructions were executed by the DUT.

This embodiment is particularly advantageous, because it allows the observation of execution or non-execution of individual instructions using the IOP identifier and reduces the number of memory accesses through including series branch identifiers and series IOP identifiers into the branch-identifier-allocation information.

In a variant of this embodiment, the first and the second IOP identifier and the series IOP identifiers only indicate if at least one IOP identifier has to be included into the intermediate runtime information. In this variant, the pre-stored reconstruction information additionally includes next-IOP-allocation information, which allocates to a branch identifier under consideration the full values of the first IOP identifier, the second IOP identifier, and the series IOP identifiers.

This variant is particularly advantageous, because the reconstruction memory can be accessed efficiently using a burst transfer or by a wide data bus.

In yet another embodiment, the trace-data-processing device is configured to generate runtime-information data using pre-defined branch identifiers allocated to branch instructions including indirect branch instructions and subsequent IOP identifiers included in the branch-identifier-allocation information.

Additionally, the trace-processing unit is configured, upon reception of a branch message indicating execution or non-execution of an indirect branch instruction, to determine, using the branch-identifier-allocation information and the IOP-allocation information, those IOP identifiers, if any, whose associated instructions were executed by the DUT, and to include the determined IOP identifiers into the runtime information data.

This embodiment is particularly advantageous for generating runtime-information data from a trace-data stream from a DUT, which is based on an architecture that supports indirect branch instructions, and wherein information on execution and non-execution of selected instructions is required.

In a variant of this embodiment, in which the branch-identifier-allocation information includes series IOP identifiers, the set of sequences of execution information elements also include sequences comprising execution information elements indicative of non-execution of indirect branch instructions.

This variant is particularly advantageous to reduce the number of read accesses to the reconstruction memory for those cases in which IOP identifiers are used to observe execution and non-execution of individual instructions and in which the runtime-information data is generated from trace data including branch messages indicative of execution and non-execution of indirect branch instructions.

In yet another embodiment of the trace-data-processing device, the values of the branch identifiers are integers, wherein the values of branch identifiers of neighboring branch instructions differ by 1 and the value of the predetermined increment is 1.

This embodiment is particularly advantageous, because it provides a simple way of choosing a unique branch identifier for each branch instruction. Moreover, an identical predetermined increment is used for all branch identifiers.

In yet another embodiment of the trace-data-processing device, the trace-data-processing device comprises a token-generation unit, which is configured to generate and output a token comprising at least a part of the runtime information data.

This embodiment is particularly advantageous for transmitting of the runtime-information data to other units within the trace-data-processing device or to other devices connected to the trace-data-processing device.

In yet another embodiment of the trace-data-processing device, the trace-data-processing unit is configured to identify within the trace-data stream any two consecutive sequences of direct branch messages that
  (i) comprise an identical sequence of branch messages, referred to as loop-message sequence, indicative of execution or non-execution of direct branch instructions and that
  (ii) produce an identical sequence of branch identifiers, referred to as loop-identifier sequence.

Moreover, upon identification of a loop-message sequence, the trace-data-processing unit is configured to store the corresponding loop-identifier sequence.

Furthermore, the trace-data-processing unit is configured to determine the sequence of branch identifiers of any loop-messages that consecutively follow the two identified loop-message sequences using the stored loop-identifier sequence.

This embodiment is particularly advantageous for generating runtime-information data from a trace-data stream indicative of an execution of a program that comprises loops. By determining a sequence of branch identifiers using the stored loop-identifier sequence, the number of read accesses to the reconstruction memory is reduced.

In a variant of this embodiment that is also configured to process programs that include indirect branch instructions, loop message sequences may also comprise branch messages indicative of non-execution of indirect branch instructions.

The second aspect of the invention claims a trace-data-processing method for reconstructing an execution flow of a program performed by a source device under test or under observation, herein DUT, using at least one source-specific trace-data stream.

The method comprises identifying in the trace-data stream
  at least one instruction-synchronization message indicative of an instruction address of an instruction executed by the DUT, and
  branch messages comprising information about an execution of a branch instruction by the DUT.

Moreover, the method comprises generating runtime-information data indicative of an at least partial reconstruction of the execution flow, using
  the identified at least one instruction-synchronization message and the identified branch messages,
  a pre-defined branch identifier allocated to each branch instruction address in the program that is associated with a branch instruction, wherein the branch identifiers are in an order ascending with an execution direction of the program, and using
  pre-stored reconstruction information stored in a reconstruction memory.

The pre-stored reconstruction information includes address-allocation information and branch-identifier-allocation information.

The address-allocation information allocates a next branch identifier to each instruction address of the program, wherein the next branch identifier is that branch identifier whose branch instruction address is closest, in the execution direction, to an instruction address under consideration, or directly at the instruction address under consideration.

The branch-identifier-allocation information allocates to each branch identifier a subsequent branch identifier, wherein the subsequent branch identifier is that branch identifier whose branch instruction address is closest, in the execution direction, to a jump-in address associated with a branch instruction of a branch identifier under consideration, or is directly at the jump-in address.

Furthermore, generating the runtime-information data comprises, upon identification of the synchronization message, storing as an intermediate runtime information that next branch identifier which corresponds to the instruction address comprised by the synchronization message according to the address-allocation information.

Furthermore, generating the runtime-information data comprises, upon identification of a given branch message that indicates that a direct branch instruction was executed,
  (i) including into the runtime information data the branch identifier stored as the inter-mediate runtime information, and
  (ii) subsequently overwriting the intermediate runtime information with that subsequent branch identifier which is allocated to the stored branch identifier according to the branch-identifier-allocation information.

Furthermore, generating the runtime-information data comprises, upon identification of a given branch message that indicates that a branch instruction was not executed, incrementing and overwriting a value of the branch identifier currently stored as the intermediate runtime information, using a predetermined increment.

The third aspect of the invention claims a computer program. The computer program comprises instructions which, when the program is executed by a computer, cause the computer to carry out the steps of the method of claim 14.

BRIEF DESCRIPTION OF THE DRAWINGS

Further embodiments will be described in the following with reference to the enclosed drawings. In the drawings:

FIG. 13 shows another example for pre-stored reconstruction information stored in the reconstruction memory of the trace-data-processing device of FIG. 10;

DETAILED DESCRIPTION

In the following, an example of an application of a trace-data-processing device is given with reference to FIGS. 1-2. Afterwards, different embodiments of the trace-data-processing device will be described with reference to FIGS. 3-14.

Figure 1:
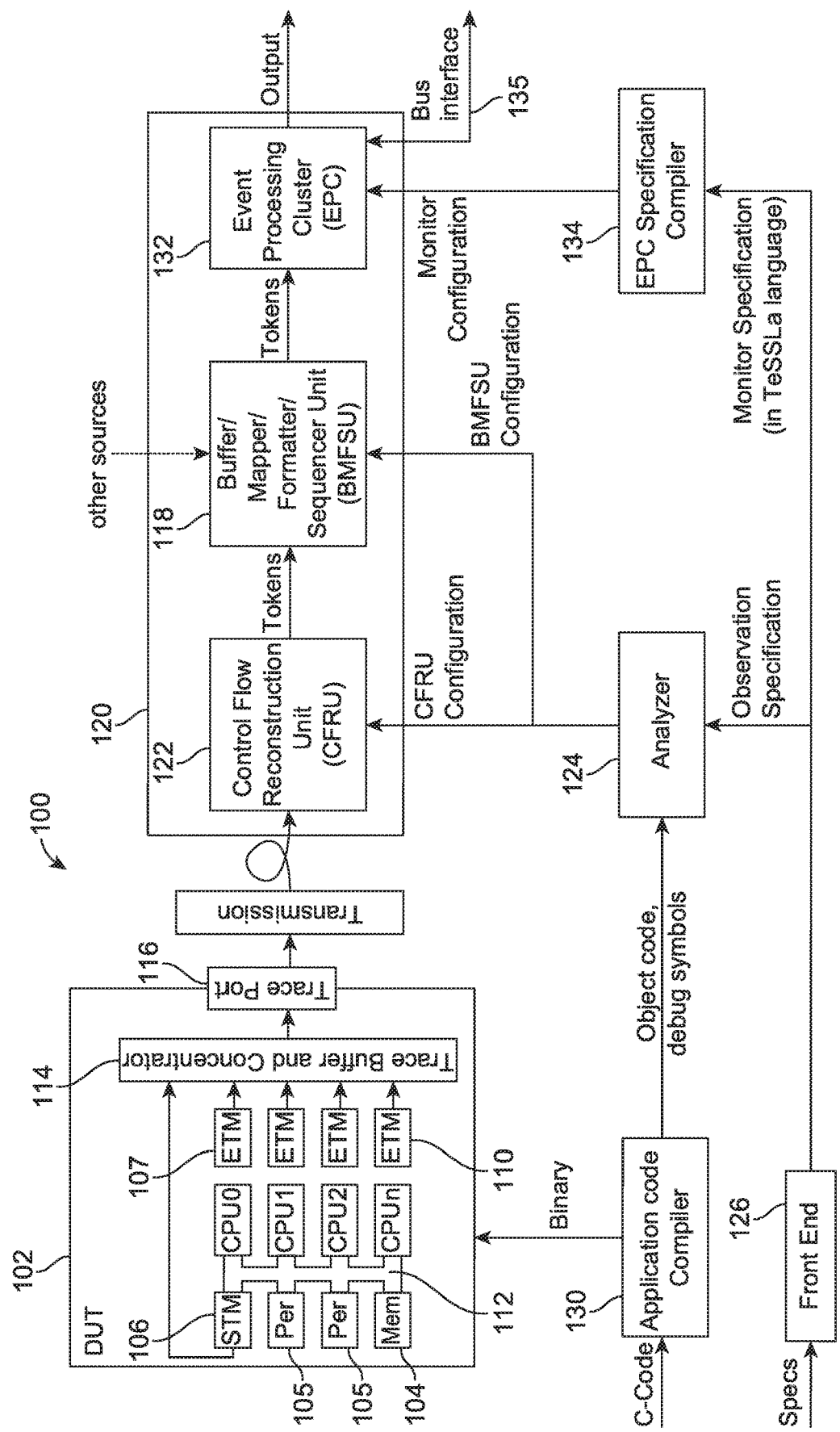
FIG. 1 is a block diagram of an exemplary setup comprising a device under test (DUT) and a trace-data-processing device.
Figure 2:
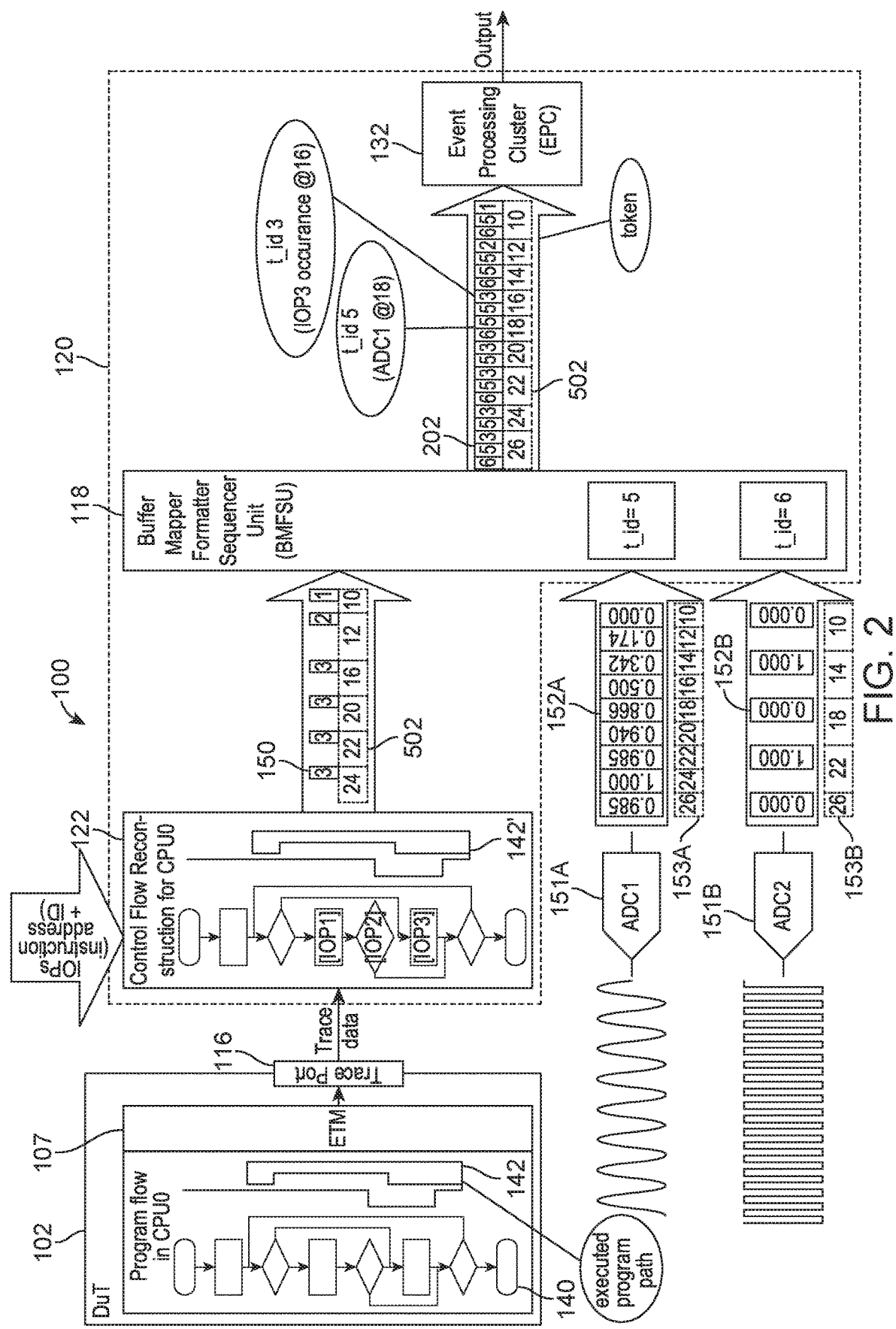
FIG. 2 is a functional overview of an exemplary interaction between the DUT and the trace-data-processing device including its individual components as shown in FIG. 1.

FIGS. 1-2 show an exemplary application scenario of the trace-data-processing device with regards to the analysis of trace data produced by a device under test or observation (DUT). FIG. 1 shows a block diagram of an exemplary setup 100 comprising a DUT 102 and a trace-data-processing device 120. The setup allows the analysis of the instructions executed by a program running on the DUT 102 through the analysis of its trace data.

In the present example, the DUT 102 is a multi-core system-on-chip (SoC) comprising a plurality of central processing units, hereinafter CPUs, four of which are shown for simplicity and labeled CPU0, CPU1, CPU2, CPUn, indicating that fewer or more than four CPUs may be present in different types of DUTs. The CPUs are connected with a memory 104 and peripheral devices, which are schematically summarized by the peripheral device blocks 105. Data communication between the memory 104, the periphery 105, and the CPUs is facilitated by a bus system 112. The program that runs on the DUT 102 can be written in any programming language. In the present embodiment, the program is written in a version of the C programming language, compiled using an application code compiler 130, and then uploaded to the DUT 102 via an input (not shown) to introduce executable binary code into the DUT 102.

To observe the execution of instructions by the program running on a given DUT, four different trace sources are commonly used:
a CPU-attached hardware trace unit,
a peripheral hardware trace unit,
hardware supported instrumentation, and
software instrumentation.

The first three sources require a specific hardware implementation in the DUT, while software instrumentation solely requires the instrumentation of the source code or binary code of the executed program. Moreover, the different types of trace sources monitor different aspects of the program execution. For example, the program flow (e.g., branches or task changes) are monitored by the CPU-attached hardware trace unit, the hardware supported instrumentation and the software instrumentation, but not by the peripheral hardware trace unit. Yet, the peripheral hardware trace units allow for an observation of the data access and peripheral events.

In different variants of the DUT 102, various combinations of the four different trace sources are used. The variant of the DUT 102 shown in FIG. 1 comprises CPU-attached hardware trace units 107-110 and hardware supported instrumentation realized through a special trace unit 106. In the DUT of FIG. 1, the CPU-attached hardware trace units 107-110 are realized by ARM® embedded trace macrocells, also referred to as ETMs. Furthermore, the special trace unit 106 is realized in the form of an ARM® system-trace macrocell module, also referred to as STM. However, the CPU-attached hardware trace units 107-110 and the special trace unit 106 may also be realized using other hardware components. The CPU-attached hardware trace units 107-110 are associated to each CPU, while the special trace unit 106 is attached to the bus 112. A trace buffer and concentrator 114 collects the generated trace data from all sources, and uses it to form a trace data stream that is output via a trace port 116. The trace data stream is then forwarded to the trace-data-processing device 120 for an instant analysis.

The trace-data-processing device 120 is used to analyze the trace-data stream and comprises a control-flow-reconstruction unit (CFRU) 122, a buffer/mapper/formatter/sequencer unit (BMFSU) 118, and an event-processing cluster (EPC) 132. The CFRU 122 of the trace-data-processing unit 120 is configured to receive the trace-data stream produced by the DUT 102 and reconstruct the control-flow of the program executed by the DUT 102. For those trace data produced by CPU-attached hardware trace units, the reconstruction involves a decompression of the highly compressed trace-data stream. Subsequently, the information of the reconstructed control flow is provided to the BMFSU 118 in form of tokens. The BMFSU 118 is configured to combine the tokens received from the CFRU 122 with information from other sources that provide information about the working of the DUT 102 into a single stream of tokens that is received by the EPC 132, where the tokens are analyzed. To meet the requirements of the analysis of the trace-data stream, the CFRU 122, the BMFSU 118, and the EPC 132 are configured externally through a front end 126.

Through the front end 126, configuration specifications, labeled Specs in FIG. 1, are received. The configuration specifications comprise an observation specification and a monitor specification.

The observation specification determines which instructions of the program executed by the DUT 122 are relevant for the control-flow reconstruction performed by the CFRU 122. One part of the observation specifications is formed by instruction observation points (IOPs). The IOPs mark relevant instructions in the object code whose execution or non-execution (i.e., skipping) by the DUT 102 is to be observed by the CFRU 122. To this end, the observation specifications are fed into an analyzer 124, where the observation specifications are combined with the object code and any relevant debug symbols from the compiler 130 to form a CFRU configuration. In the process, each IOP is assigned a unique IOP identifier (IOPID) that allows the IOP to be distinguished from any other IOP. Moreover, the analyzer 124 creates from the observation specification a BMFSU configuration, which comprises information about how the BMFSU 118 is to merge the output of the CFRU 118 with information received by the BMFSU 118 from other sources. Finally, the monitor specification is used to determine how the EPC 132 processes the incoming stream of tokens. For use with the variant of the trace-data-processing device 120 shown in FIG. 1, the monitor specification may be given in the known Temporal Stream-based Specification Language (TeSSLa), which is compiled by an EPC-specification compiler 134 to generate a monitor configuration, which is subsequently uploaded to the EPC 132. TeSSLa is a stream-based specification language designed for specifying and analyzing the behavior of cyber-physical systems (CPS). Examples of CPS include smart grid power systems, autonomous automobile systems, medical monitoring systems, process control systems, robotics systems, and automatic pilot avionics. In other variants of the EPC 132 other suitable languages are used.

Besides the possibility to configure the EPC 132 using the configuration specification, it is also possible to access the CFRU 122, the BMFSU 118, and the EPC 132 comprised therein using a bus interface 135. The bus interface may be used to read and write any relevant memories.

In the following, a more detailed overview of the functional interplay between the DUT 102 and the trace-data-processing device 120 including its components the CFRU 122, the BMFSU 118, and the EPC 132 will be given with reference to FIG. 2.

FIG. 2 is an illustration conveying a functional overview of an exemplary interaction between the DUT 102 and the trace-data-processing device 120 including its individual components as shown in FIG. 1. The central-processing unit CPU0, hereinafter referred to in short by only the reference label "CPU0", of the DUT 102 executes a computer program whose individual instructions are represented schematically by a flow chart 140 shown within the box representing the DUT 102 in FIG. 2. FIG. 2 also shows an order in which the DUT 102 executes the instructions comprised in the flow chart 140 symbolized by an executed program path 142 shown on the right-hand side of the flow diagram 140. During program execution, the CPU-attached hardware trace unit 107, in this example a program flow trace PFT, sends a trace-data stream identifying the executed instructions through the trace port 116 to the CFRU 122 of the trace-data-processing device 120.

Based on the trace data and the object code of the program, which is included in the CFRU configuration, the CFRU 122 generates a reconstructed program path 142' that forms a reconstruction of the executed program path 142. Since the information contained in the trace-data stream generated by the CPU-attached hardware supported instrumentation is very dense, not all executed instructions can be analyzed in an online-analysis. Instead, only those instructions that are marked with an IOP, which are part of the CFRU configuration, are considered relevant by the CPRU 122. If an instruction marked with an IOP is executed or skipped, depending on the configuration, a message, hereinafter also referred to as a token, is created, wherein the associated IOPID is used as a token identifier 150, which indicates the event that led to the creation of the token. Subsequently, the token is forwarded to the BMFSU 118. The stream of tokens forwarded from the CFRU 122 to the BMFSU 118 is indicated by the arrow connecting the two units in FIG. 3.

Besides the token identifier, each token created by the CFRU 122 also comprises a sequence indicator 502. The sequence indicator is a value that specifies a point in time associated with the occurrence of the event that led to the creation of the token relative to at least one other point in time associated with an occurrence of one or more other events. The sequence indicator is particularly useful in those scenarios where different sources of trace data are merged into a single trace-data stream to establish an order between the trace data provided by different trace sources. In a non-limiting example, the merged data is used to identify race conditions. If a granularity of event sequence indices represents a constant time span, the sequence indicator corresponds to a timestamp.

FIG. 2 only depicts the forwarding of trace data from the CPU-attached hardware trace unit 107, representative for all CPU-attached hardware trace units 107-110, to the trace-data-processing device 120. However, trace data from peripheral hardware trace units, hardware supported instrumentation or from software instrumentation may also be processed by the trace-data-processing device 120. Since the trace data from those latter trace sources is provided in a less compressed form in comparison with the trace data from the CPU-attached hardware trace units 107 to 110, a control flow reconstruction is not required. Instead, the CFRU 122 assigns a sequence identifier to the trace data as it arrives, buffers the trace data, and forwards it together with the tokens in a single stream, sorted by sequence identifier, to the BMFSU 118. The BMFSU 118 then further processes the data. In another variant, the trace data from the peripheral hardware trace units, the hardware supported instrumentation, and the software instrumentation bypasses the CFRU 122 and is directly connected to the BMFSU 118. In this variant, the BMFSU 118 is configured to assign a token identifier and a sequence indicator to the data and consolidate the streams of trace data from the different trace data sources into a single stream of tokens.

Other data sources that do not provide tokens can also be connected to the BMFSU 118. In the example shown in FIG. 2, the BMFSU 118 is also connected to two analog-to-digital converters labeled (and referred to in the following as) ADC1 and ADC2. Analog-to-digital converters may be used in recording any analog signal, such as analog output signals and analog input signals of the DUT 102, which provide additional information for the analysis of the DUT behavior. In the example shown in FIG. 2, the ADC1 and the ADC2 each sample an analog signal and convert the analog signal into a data stream comprising sample values 152A and 152B and respective associated sequence indicators 153A and 153B. Subsequently, the BMFSU 118 receives the data streams from the ADC1 and the ADC2. In the example shown in FIG. 2, the BMFSU 118 maps each incoming sample value to the token identifier "t_id=5" for ADC1 and "t_id=6" for ADC2 and creates a token comprising the token identifier, the sequence indicator, and the sample value as payload data. In general, through proper BMFSU configuration, a different mapping scheme may be defined for each data source.

In a further step, the BMFSU 118 consolidates the input data streams received from the different data sources connected to the BMFSU 118. The consolidation is done by sorting and unifying the input streams according to their sequence indicator into a single stream of tokens. In variants, where the BMFSU 118 is connected to input sources that do not provide a sequence indicator, the BMFSU 118 first assigns sequence indicators to the incoming data. In a last step, the BMFSU 118 prepares the consolidated stream of tokens for output. The stream of tokens is forwarded as an input to the EPC 132.

In the example of FIG. 2, only the CFRU 122 and the two analog-to-digital converters ADC1 and ADC2 are connected to the BMFSU 118. However, it is also possible to connect additional sources to the BMFSU 118. In another variant, the BMFSU 118 is also connected to external bus analyzers that examine the data stream on a bus, e.g. a CAN bus or an Ethernet bus, and forward any relevant information to the BMFSU 118 for incorporation into the trace data analysis. This variant is particularly advantageous for monitoring a communication through the CAN bus between different CPUs of a multicore processor. If also the different cores of the multicore CPUs are attached to the BMFSU 118, an emission of a message by one of the CPUs, a transmission through the CAN bus as well as a reception of the message by another CPU can potentially be observed. In yet another variant, the BMFSU 118 is also connected to other sources of data, e.g., digital input data.

In another variant, the BMFSU 118 is additionally configured to buffer the input data streams. In such variants, the BMFSU 118 either comprises or has otherwise access to a memory unit, where data can be written to or read from.

In yet another variant of the BMFSU 118, the BMFSU 118 comprises a number of outputs different from that shown in FIG. 2, depending on the respective implementation of the EPC 132. Which tokens are forwarded in which output stream is determined by the user in the observation specification.

After the preceding description of a possible application of the trace-data-processing device, in the following, a more detailed description of the trace-data-processing device will be given with reference to FIGS. 3-14. The following description of the trace-data-processing device will be focused on the aspect of the execution flow reconstruction performed by the trace-data-processing device.

Figure 3:
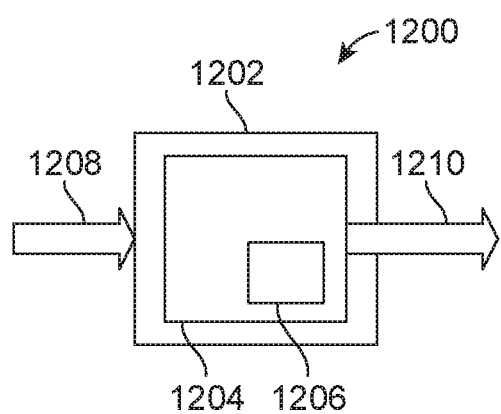
FIG. 3 is a block diagram of an embodiment of a trace-data-processing device for reconstructing an execution flow of a program performed by a source device under test or under observation.

FIG. 3 is a block diagram of an embodiment of the trace-data-processing device 1202 for reconstructing an execution flow of a program performed by a source device under test or under observation, herein DUT, using at least one source-specific trace-data stream 1208.

The trace-data-processing device 1202 comprises a trace-data-processing unit 1204, which is configured to identify in the trace-data stream 1208 at least one instruction-synchronization message indicative of an instruction address of an instruction executed by the DUT, and branch messages comprising information about an execution of a branch instruction by the DUT.

Moreover, the trace-data-processing unit 1204 is configured to generate runtime-information data 1210 indicative of an at least partial reconstruction of the execution flow of the program run by the DUT 102, using the identified at least one instruction-synchronization message and the identified branch messages, a pre-defined branch identifier allocated to each branch instruction address in the program that is associated with a direct branch instruction, wherein the branch identifiers are in an order corresponding to an execution direction of the program, and using pre-stored reconstruction information stored in a reconstruction memory 1206.

The pre-stored reconstruction information includes (i) address-allocation information that allocates a next branch identifier to each instruction address of the program, wherein the next branch identifier is that branch identifier whose branch instruction address is closest, in the execution direction, to an instruction address under consideration, or directly at the instruction address under consideration, and (ii) branch-identifier-allocation information that allocates to each branch identifier a subsequent branch identifier, wherein the subsequent branch identifier is that branch identifier whose branch instruction address is closest, in the execution direction, to a jump-in address associated with a branch instruction of a branch identifier under consideration, or is directly at the jump-in address.

Moreover, the trace-data-processing unit 1204 is configured, upon identification of the synchronization message, to store as an intermediate runtime information that next branch identifier which corresponds to the instruction address comprised by the synchronization message according to the address-allocation information.

Furthermore, the trace-data-processing unit 1204 is configured, upon identification of a given branch message that indicates that a direct branch instruction was executed, (i) to include into the runtime-information data 1210 the branch identifier stored as the intermediate runtime information, and (ii) to subsequently overwrite the intermediate runtime information with that subsequent branch identifier which is allocated to the stored branch identifier according to the branch-identifier-allocation information.

Furthermore, the trace-data-processing unit 1204 is configured, upon identification of a given branch message that indicates that a branch instruction was not executed, to update the intermediate runtime information by adding a predetermined increment to the value of the intermediate runtime information.

FIG. 3 is an illustration showing an outgoing arrow 1210 representing the runtime-information data, which is provided to external devices. However, in variants of the trace-data-processing device 1200, the trace-data-processing device 1200 comprises further units, such as the BMFSU 118 or the EPC 132 shown in FIG. 1, that are configured to process the runtime information data internally.

Figure 4:
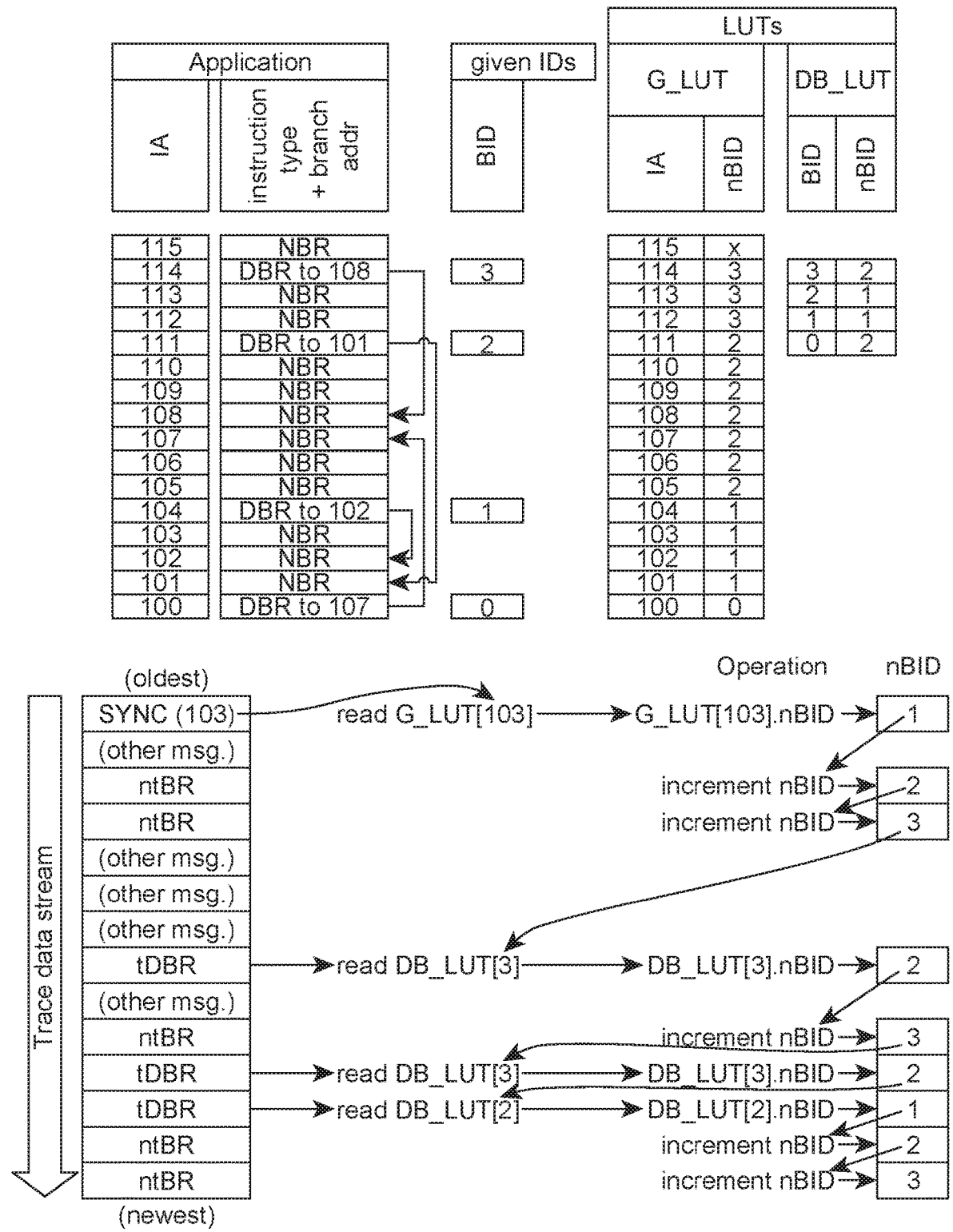
FIG. 4 shows an example of a program flow reconstruction as performed by the trace-data-processing device shown in FIG. 3.

In the following, a more detailed description will be given of how the pre-stored reconstruction information can be used to generate the intermediate runtime information and the runtime-information data with reference to FIG. 4. FIG. 4 shows an example of a program flow reconstruction as performed by the trace-data-processing device 1202 shown in FIG. 3.

FIG. 4 is separated into an upper and a lower part. In the upper part, representations of three tables labeled "Application", "given IDs", and "LUTs" are given. The table "Application" is a representation of an exemplary program that is executed by the DUT 102, the table "given IDs" is a representation of an exemplary assignment of branch identifiers to branch instructions, and the table "LUTs" is a representation of an exemplary address-allocation information and an exemplary branch-identifier-allocation information in the form of a look-up table.

The table "Application" is a representation of the program executed by the DUT 102 and comprises a column labeled "IA", hereinafter referred to as column "IA", and a column labeled "Instruction type+branch addr", hereinafter referred to as column "Instruction".

The column "IA" is a list of the instruction addresses comprised in the program executed by the DUT 102. The column "Instruction" indicates for each instruction address listed in the column "IA", if the instruction of the respective instruction address corresponds to a direct branch instruction, indicated as "DBR", or to an instruction other than the branch instruction, indicated as "NBR". Moreover, if an instruction address corresponds to a direct branch instruction, the column "Instruction" also indicates the jump-in address of the direct branch instruction.

The exemplary program represented by the table "Application" comprises 16 instruction addresses starting from an instruction address "100" and ending at an instruction address "115". Moreover, the exemplary program represented by the table "Application" comprises four direct branch instructions at the instruction addresses "100", "104", "111", and "114". The jump-in address for the direct branch instructions at the instruction addresses "100", "104", "111", and "114" is the instruction address "107", "102", "101", and "108", respectively.

In addition to the jump-in addresses given for each direct branch instruction in column "Instruction", the change in the execution flow corresponding to each of the direct branch instructions is visualized by an arrow on the right side of the table "Application". The tail of the arrow indicates the instruction address corresponding to the direct branch instruction, while the head of the arrow indicates the instruction address that corresponds to the respective jump-in address. The information comprised in the table "Application" can be statically determined from the program image created by the application code compiler 130.

To perform a program flow reconstruction of the program in the table "Application", a branch identifier has to be assigned to each branch instruction. An exemplary assignment of branch identifiers to branch instructions is given in the table "given ID". The table "given ID" comprises a single column labeled "BID". The column "BID" assigns a branch identifier, hereinafter also referred to as BID, to each instruction address of the column "IA" of the table "Application" which corresponds to a branch instruction.

The exemplary assignment shown in table "given ID" comprises four BIDs labeled "0" to "3" corresponding to the direct branch instructions at the instruction address "100", "104", "111", and "114", respectively. In the example of FIG. 4, the BIDs are assigned to the direct branch instruction in an ascending order with respect to the execution direction of the program. Moreover, the difference between the BID of one branch instruction to the BID of the following branch instruction is equal to 1. This order of assignment is advantageous for the processing of those branch messages which are indicative of non-execution of a branch instruction. However, in other embodiments of the trace-data-processing device 1202 the BIDs are assigned in a different order.

The table "LUTs" comprises an exemplary representation of the address-allocation information and the branch-identifier-allocation information, which can be statically determined from the table "Application" and the table "given ID".

The table "LUTs" comprises two sub-tables labeled "G_LUT" and "DB_LUT", wherein the sub-table "G_LUT" is the exemplary representation of the address-allocation information, while the sub-table "DB_LUT" is the exemplary representation of the branch-identifier allocation for the exemplary program represented by the table "Application".

The sub-table "G_LUT" comprises two columns labeled "IA" and "nBID". The column "IA" is identical to the column "IA" of the table "Application" and comprises the instruction addresses of the exemplary program executed by the DUT 102. The column "nBID" allocates to each instruction address from the column "IA" a next branch identifier, wherein the next branch identifier is that branch identifier whose branch instruction address is closest, in the execution direction, to an instruction address under consideration, or directly at the instruction address under consideration. For example, for the instruction address "100", the next branch identifier listed in column "nBID" is the BID "0", since it corresponds to that branch identifier which is located directly at the instruction address under consideration. For the instruction addresses "101"-"104" the next branch identifier is "1", since BID "1" corresponds to that branch identifier whose branch instruction address is closest, in the execution direction, to those instruction addresses (i.e. instruction addresses "101"-"103") or located directly at the instruction address under consideration (i.e. instruction address 104). Analogously, the next branch identifiers of the instruction addresses "105"-"111" is BID "2" and the next branch identifier for the instruction addresses 112-114 is BID "3".

The column "nBID" corresponding to the instruction address "115" is marked with an "x". The "x" indicates that no next branch identifier is known for the instruction address 115 and is used in an exemplary manner. In other embodiments of the trace-data-processing device 1202, another symbol or combination of symbols is use to mark missing next branch identifiers. In other embodiments of the trace-data-processing device 1202, instruction addresses which cannot be assigned a next branch identifier are not listed in the sub-table "G_LUT".

The sub-table "DB_LUT" comprises two columns labeled "BID" and "nBID". The column "BID" comprises all branch identifiers of the table "given ID". Moreover, the column "nBID" allocates to each branch identifier in the column "BID" a subsequent branch identifier, wherein the subsequent branch identifier is that branch identifier whose branch instruction address is closest, in the execution direction, to a jump-in address associated with a branch instruction of a branch identifier under consideration, or is directly at the jump-in address. For example, the column "nBID" allocates to the BID "0" the subsequent branch identifier "2", since the BID "2" is that branch identifier whose branch instruction address is closest, in the execution direction of the program, to the jump-in address associated with the branch instruction of the BID "0". Analogously, the subsequent branch identifier corresponding to the BID "1", "2", and "3" are "1", "1", and "2", respectively.

In the embodiment shown in FIG. 4, the subsequent branch identifier is given in terms of the absolute value of the corresponding BID. In other embodiments the subsequent branch identifier is given in terms of a relative offset between the BID and the subsequent branch identifier. The table "LUTs" as an embodiment of the instruction-address allocation and the branch-identifier allocation is stored in the reconstruction memory 1206 of the trace-data-processing device 1202.

After an exemplary embodiment of the address-allocation information and the branch-identifier-allocation information has been described with regard to the upper part of FIG. 4, an example of how the trace-data-processing unit 1204 uses this information will in the following be described in the following with regard to the lower part of FIG. 4.

On the left-hand side of the lower part of FIG. 4, an exemplary trace-data stream produced as a result of the execution of the program represented in the table "Application" by the DUT 102 is shown. The trace-data stream comprises 14 trace messages. An arrow labeled "Trace data stream" indicates a sequence of arrival of the trace messages at the trace-data-processing device 1202, wherein the trace messages closest to the tail of the arrow are received earlier by the trace-data-processing unit 1204, while the trace messages closer to the head of the arrow are received later. The sequence of arrival is also indicated by the labels "(oldest)" and "(newest)" that frame the trace-data stream.

Even though each trace architecture is different, trace architectures generally differentiate between direct and indirect branch instructions. Direct branch instructions comprise all those instructions that lead to a change in the program flow, wherein the jump-in or target address of the instruction is determined at compile time and therefore statically given in the object code of the program. In contrast, indirect branch instructions comprise all those instructions that lead to a change in the program flow for which the jump-in or target address of the instruction cannot be determined at compile time and, thus, is determined at runtime.

Information about execution or non-execution of direct and indirect branch instructions are disclosed by the trace architecture in the form of trace messages. The embodiment of the trace-data-processing device 1202 shown in FIG. 3 is only configured to process trace messages corresponding to execution or non-execution of direct branch instructions. Embodiments of the trace-data-processing device that are configured to process branch messages corresponding to execution or non-execution of, both, direct and indirect branch instructions will be discussed with reference to FIG. 5.

Each trace message contained within the exemplary trace-data stream comprises a label that identifies the type of the respective trace message. The labels used are "SYNC" for an instruction-synchronization message, "tDBR" for an executed (or taken) direct branch instruction, "ntBR" for a non-executed (or not-taken) direct branch message, and "(other msg.)" for a trace message comprised within the trace-data stream that is not relevant for the program flow reconstruction. Examples of direct branch messages in different architectures are the Nexus branch history message, the ARM® PFT/ETMv4 atom message, and the ARM® ETMv3 P-header.

In the center of the lower part of FIG. 4, operations are listed in a column labeled "Operation" that are executed by the trace-data-processing unit 1204 to change the intermediate runtime information in response to the reception of instruction-synchronization messages ("SYNC") or branch messages ("ntBR" or "tDBR") comprised in the exemplary trace-data stream.

Upon reception of a "SYNC"-message or a "tDBR"-message, the trace-data-processing unit 1204 has to perform a reading operation to update the intermediate runtime information.

In case of a "SYNC"-message, the trace-data-processing unit 1204 first performs a read operation of the sub-table "G_LUT" to retrieve the row corresponding to the instruction address indicated by the "SYNC"-message, which is indicated by "read G_LUT[]" in the column "Operation", wherein the number in brackets corresponds to the instruction address indicated by the "SYNC"-message. Afterwards, the trace-data-processing unit 1204 updates the intermediate runtime information using the next branch identifier retrieved from the sub-table "G_LUT", which is indicated by the operation "G_LUT[] .nBID" in the column "Operation", wherein the number in brackets corresponds to the instruction address indicated by the "SYNC"-message.

In case of a "tDBR"-message, the trace-data-processing unit 1204 performs a read operation to the sub-table "DB_LUT" to retrieve the row corresponding to the BID currently stored as the intermediate runtime information, which is indicated by the operation "read DB_LUT[]" in the column "Operation", wherein the number in brackets indicates the BID currently stored as the intermediate runtime information.

Upon reception of a "ntBR"-message, due to the ordering with which the branch identifiers were assigned to the instruction addresses, a read operation to the table "LUTs" is not required. Instead, the trace-data-processing unit 1204 updates the intermediate runtime information simply by incrementing the value currently stored BID in the intermediate runtime information by 1 as is indicated by the operation "Increment nBID" in the column "Operation".

The value of the BID stored as the intermediate runtime information is given in square-boxes in a column labeled "nBID" on the right-hand side of the lower part of FIG. 4, wherein each square-box represents the intermediate runtime information after the processing operations listed in the same row in the column "Operation" have been performed. The intermediate runtime information is indicative of that BID whose associated branch instruction will be encountered next during the execution of the program by the DUT 102.

In the following, an outline of the processing operation performed by the trace-data-processing unit 1204 in response to the reception of the trace messages comprised by the exemplary trace-data stream shown in FIG. 4 is described in more detail. The outline follows the arrows, which indicate an order in which the processing operations are performed and the intermediate runtime information updated. Variants of the exemplary trace-data stream shown in FIG. 4 will also be used to describe the functioning of other embodiments of the trace-data-processing device with reference to FIGS. 5-13.

The first trace message received and processed by the trace-data-processing unit 1204 is a "SYNC"-message. The "SYNC"-message is indicative of execution of an instruction associated with the instruction address "103" by the DUT 102. In response to the reception of the instruction-synchronization message, the trace-data processing unit 1204 identifies the next branch identifier corresponding to the instruction address of the instruction-synchronization message by reading the corresponding row from sub-table "G_LUT", which is indicated by the operation labeled "read G_LUT[103]". Subsequently, the trace-data-processing unit 1204 uses the retrieved next branch identifier comprised within the row read from sub-table "G_LUT" as the intermediate runtime information, which is indicated by the operation labeled "G_LUT[103].nBID". As a result, the branch identifier stored as the intermediate runtime information is the branch identifier "1".

In FIG. 4, the "SYNC"-message is the first trace message received by the trace-data-processing device 1202. That the "SYNC"-message is the first message of a trace-data stream is not always the case. In cases, where the "SYNC"-message is not the first trace message, the trace-data-processing unit 1204 waits for the first "SYNC"-message to start the processing of the trace-data stream.

The next relevant trace messages received by the trace-data-processing device 1200 are two "ntBR"-messages. In response the trace-data-processing unit 1204 updated the intermediate runtime information by incrementing the intermediate runtime information by 1 in two steps. A reading operation is not required. As a result, the branch identifier stored as the intermediate runtime information is the BID The next relevant trace message received by the trace-data-processing device 1204 is a "tDBR"-message indicative of execution of a direct branch instruction. From the intermediate runtime information, the trace-data-processing unit 1204 is able to determine that the executed branch instruction corresponds to BID "3". As a result, the trace-data processing unit reads the row correspond to BID "3" from sub-table "DB_LUT" as is indicated by the operation labeled "read DB_LUT[3]". Afterwards, the trace-data-processing unit 1204 sets the intermediate runtime information to the subsequent branch identifier read from sub-table "DB_LUT". As a result, the intermediate runtime information corresponds to the BID "2".

The next relevant trace message received by the trace-data processing device 1200 is a another "ntBR"-message. The trace-data processing unit increments the intermediate runtime information by 1. As a result, the intermediate runtime information corresponds to BID "3".

The next trace message is a branch message indicative of execution of a direct branch instruction. Therefore, the trace-data-processing unit 1204 reads from sub-table "DB_LUT" that row which corresponds to the BID "3". Subsequently, the trace-data processing unit sets the intermediate runtime information to the subsequent branch identifier read from sub-table "DB_LUT". As a result, the intermediate runtime information is set to "2".

The next trace message received by the trace-data processing device 1200 is also indicative of the execution of a direct branch instruction. Therefore, the trace-data-processing unit 1204 repeats the operations performed for the processing of the previous trace message. However, now, the row corresponding to the BID "2" is read from sub-table "DB_LUT". As a result, the intermediate runtime information is updated to the BID "1", which corresponds to the retrieved subsequent branch identifier.

The two last trace messages received by the trace-data-processing device 1200 are both indicative of non-execution of a branch instruction. Consequently, the trace-data-processing unit 1204 increments the intermediate runtime information by 2 in two steps each with an increment of 1. Therefore, the intermediate runtime information corresponds to the BID "3", which is also the final value of the intermediate runtime information after the processing of the trace-data stream.

Not shown in FIG. 4 is the generation of the runtime information data from the intermediate runtime information. In the embodiment shown in FIG. 4, the trace-data-processing unit 1024 is configured, upon reception of a branch message indicating execution of a branch instruction, to include into the runtime information data the BID stored as the intermediate runtime information.

In other embodiments of the trace-data-processing device 1202, the trace-data-processing unit 1204 is additionally configured, upon identification of a branch message that indicates that a branch instruction was not executed, to include into the runtime information data the branch identifier stored as the intermediate runtime information. In variants of this embodiment, marks are included into the runtime information data that distinguish those branch identifiers of branch instructions that were executed from those branch identifiers of branch instructions that were not executed.

In yet other embodiments of the trace-data-processing device 1200, the trace-data-processing unit 1204 is additionally configured, upon identification of a branch message, to include into the runtime information a time information associated with the processing of the branch message by the trace-data-processing unit.

In yet other embodiments of the trace-data-processing device 1200, the table "given ID" or the table "DB_LUT" include marks (not shown) for distinguishing those of the branch identifiers which are to be included into the runtime information data from those of the branch identifiers which are not to be included into the runtime information data. Moreover, the trace-data-processing unit 1204 is configured, upon identification of a branch message that indicates execution or non-execution of a branch instruction, to include into the runtime information data only those branch identifiers stored in the intermediate runtime information that are marked for inclusion into the runtime information data.

The embodiment of the trace-data-processing device 1202 particularly suited to perform a program flow reconstruction for programs that only comprise direct branch instructions. However, the embodiment of the trace-data-processing device 1202 can be easily adapted to a wider range of applications by adapting the pre-stored reconstruction information stored in the reconstruction memory 1206. In the following, different examples of program flow reconstructions performed by preferred embodiments of the trace-data-processing device will be described with reference to FIGS. 5-13.

The exemplary program used in the program flow reconstruction shown in FIG. 4 solely comprises direct branch instruction. However, preferred embodiments of the trace-data-processing device are also configured to perform a program flow reconstruction for programs comprising also indirect branch instructions. An example of such a program flow reconstruction is illustrated in FIG. 5.

Figure 5:
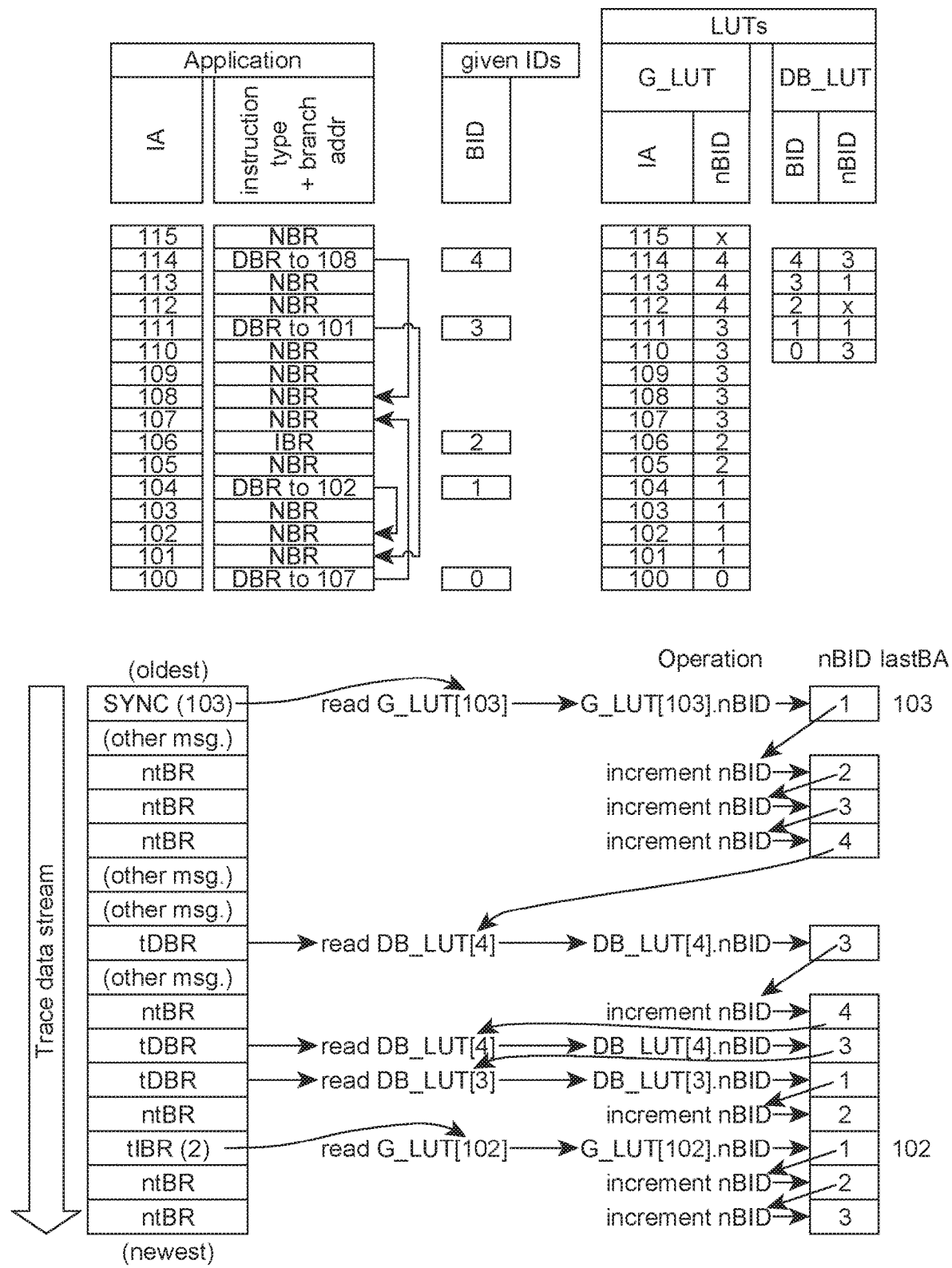
FIG. 5 shows another example of a program flow reconstruction.

FIG. 5 shows another example of a program flow reconstruction.

Identically to FIG. 4, FIG. 5 is separated into a lower and an upper part. In the upper part of FIG. 5, the table "Application", the table "given ID", and the table "LUTs" are shown, while the lower part of FIG. 5 shows an exemplary trace-data stream and how it is processed using the information given in the upper part of FIG. 5.

As can be seen by comparing the tables "Application" of FIG. 4 and FIG. 5, all the direct branch instructions comprised in the exemplary program of FIG. 4 are also comprised in the exemplary program of FIG. 5. Additionally, the program of FIG. 5 comprises an indirect branch instruction associated with the instruction address "106". The indirect branch instruction at the instruction address "106" is labeled "IBR" in the column "Instruction type". In comparison to the direct branch instructions, the row of column "Instruction type" corresponding to the indirect branch instruction does not include a jump-in instruction address, since the jump-in instruction address of indirect branch instructions is unknown at compile time.

Due to the additional indirect branch instruction, the labeling of the branch identifiers given in table "given ID" of FIG. 5 was updated to now comprise branch identifiers numbered from "0"-"4", wherein BID "2" corresponds to the indirect branch instruction at instruction address "106" and BIDs "3" and "4" now correspond to the direct branch instruction at instruction address "111" and "114", respectively.

Furthermore, the sub-tables "G_LUT" and "DB_LUT" of table "LUTs" were changed accordingly. In particular, sub-table "DB_LUT" now comprises an entry for each branch identifier "0"-"4". Since for indirect branch instructions the jump-in address is not known at compile time, the subsequent branch identifier corresponding to the branch identifier of the indirect branch instruction is marked with an "x". However, in variants of the trace-data-processing device the subsequent branch identifier of an indirect branch instruction is marked using a different symbol or a different combination of symbols. In yet another variant of the trace-data-processing device, branch identifiers associated to indirect branch instructions are not included into the sub-table "DB_LUT".

The additional indirect branch instruction comprised in the program also influences the program flow reconstruction that is shown in the lower half of FIG. 5. Besides the "SYNC"-message and the "tDBR"-messages, the trace-data stream now also comprises a branch message labeled "tIBR" indicative of execution of an indirect branch instruction. Moreover, the "ntBR"-messages now can indicate non-execution of, both, direct and indirect branch instruction. Since the jump-in address of an indirect branch instruction is only known at runtime, the "tIBR"-message also comprises an instruction address, which corresponds to the jump-in address of the executed indirect branch instruction. Examples of indirect branch messages in different architectures are the Nexus indirect branch history message and the ARM® PFT/ETMv3/ETMv4 branch address message.

A "tIBR"-message can also be received when an exception is executed by the observed CPU in the DUT 102. If the exception occurs, an equivalent of an indirect branch is executed by the observed CPU of the DUT 102 from the instruction address which was active at the moment the exception occurred. This instruction address is provided in the trace-data stream. This scenario is not shown in FIG. 5.

The processing of the trace-data stream shown in the lower part of FIG. 5 is largely similar to the processing of the trace-data stream shown in FIG. 4. Thus, in the following, only the differences will be highlighted.

One difference between the processing of the trace-data stream shown in FIG. 4 and FIG. 5 is the handling of the instruction addresses comprised within the "SYNC"-message or the "tIBR"-message. To reduce the required bandwidth for the output of the trace messages, trace architectures commonly only fully transmit a first instruction address while all following instruction addresses only indicate those parts of the instruction address to be transmitted that changed in comparison to the first instruction address. As a consequence, preferred embodiments of the trace-data-processing device are also configured to, at least, temporarily store the last transmitted instruction address, which is indicated for the embodiment of the trace-data-processing device of FIG. 5 by the column labeled "lastBA".

In the exemplary trace-data stream, the "SYNC"-message comprises a full instruction address "103", while the "tIBR"-message only comprises that part of the jump-in address of the indirect branch instruction which is different to the instruction address of the "SYNC"-message. In general, a given "tIBR"-message only comprises those parts of the jump-in address that has changed to the last known address known from a "SYNC"-message or a previous "tIBR"-message. In this example, this difference corresponds to the least significant digit of the jump-in address, which is "2". Therefore, when the trace-data-processing unit receives the "SYNC"-message, it stores the instruction address "103" for later use, which is indicated by an entry "103" in the column "lastBA". Subsequently, when the "tIBR"-message is received, the trace-data-processing unit reconstructs the full instruction address by replacing the least significant digit of the entry "103" in the column "lastBA" with the digit comprised in the "tIBR"-message. The resulting instruction address "102" is then also stored for later use, which is indicated by an entry "102" in the column "lastBA".

Another difference between the processing shown in FIG. 4 and FIG. 5 is related to the processing of the "tIBR"-message. Since a subsequent branch identifier cannot be allocated to an indirect branch instruction at compile time, the intermediate runtime information is updated using that next branch identifier from the sub-table "G_LUT" which corresponds to the instruction address comprised in the "tIBR"-message. Such a processing is indicated in the lower half of FIG. 5 by the operations labeled "read G_LUT[102]" and "G_LUT[102].nBID". Branch messages indicating non-execution are processed identically independent of whether the branch message regards a direct or an indirect branch instruction. Variants of the embodiment of the trace-data-processing device of FIG. 5 are also configured to include into the runtime information data the jump-in address of the branch instruction together with the stored branch identifier, upon reception of a branch message indicating that an indirect branch instruction was executed.

In the embodiment of the table "LUTs" shown in FIGS. 4-5, a memory access to table "DB_LUT" is necessary for each "tDBR" branch message. These frequent memory accesses limit the bandwidth of the trace-data stream that can be processed by the trace-data-processing device. The table "LUTs" of preferred embodiments of the trace-data-processing device comprises series branch identifiers that permit a reduction of memory accesses. The concept of series branch identifiers will be explained in the following with reference to FIG. 6.

Figure 6:
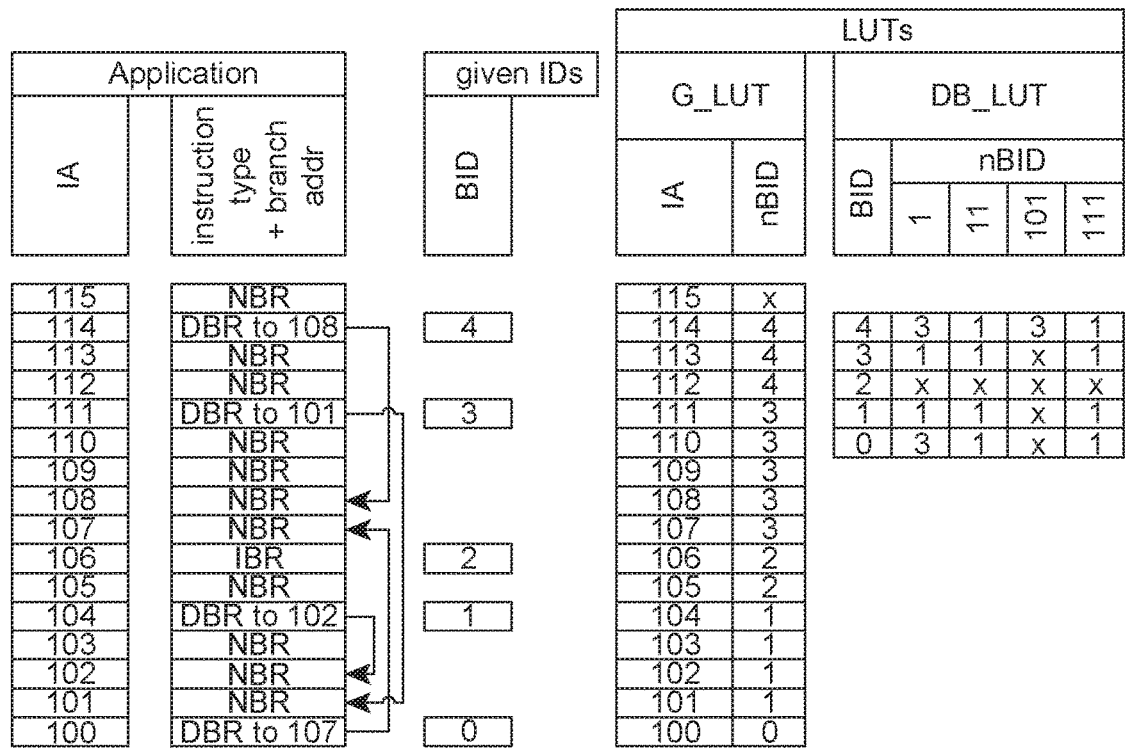
FIG. 6 shows an example of a program flow reconstruction based on series branch identifiers.
Figure 6:
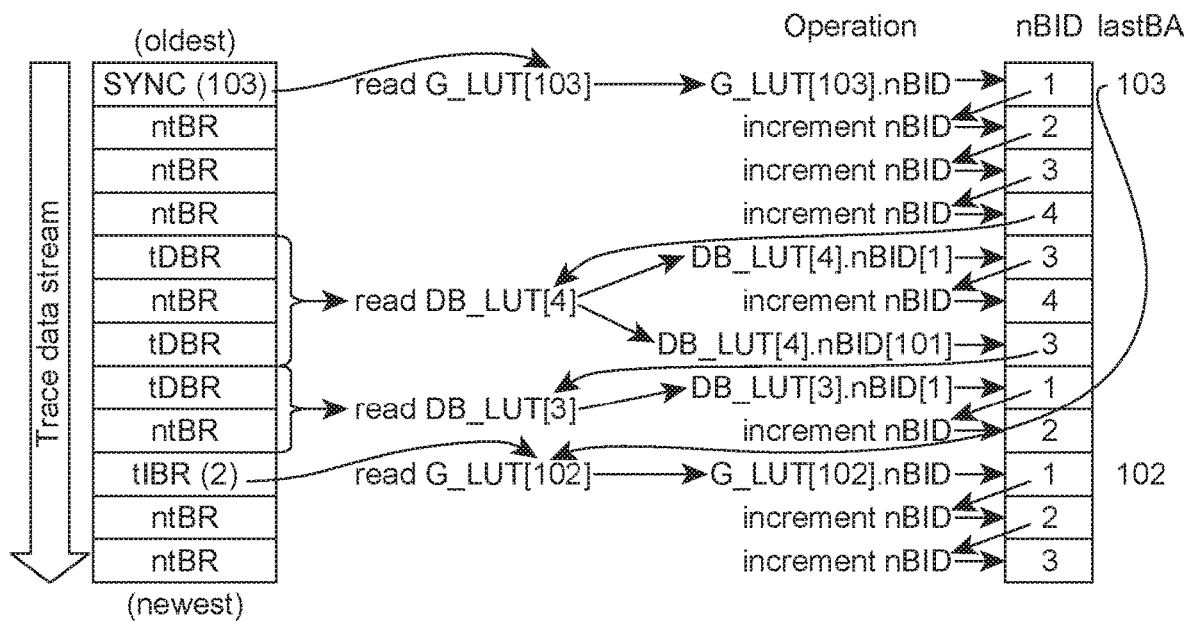

FIG. 6 shows an example of a program flow reconstruction based on series branch identifiers.

Identically to FIG. 4-5, FIG. 6 is separated into a lower and an upper part. In the upper part of FIG. 6, the table "Application", the table "given ID", and the table "LUTs" are shown, while the lower part of FIG. 5 shows an exemplary trace-data stream and how it is processed using the information given in the upper part of FIG. 6.

While the table "Application" and the table "given ID" are identical in FIG. 5 and FIG. 6, FIG. 6 shows an alternative embodiment of the table "LUTs". While in FIGS. 4-5 the table "DB_LUT" allocated to each branch identifier one subsequent branch identifier, the table "DB_LUT" of FIG. 6 allocates to each branch identifier four series branch identifiers. Each series branch identifier corresponds to one of the four sequences of branch messages labeled "1", "11", "101", and "111".

Each sequence of branch messages consists of a number of execution information elements each indicative of a received branch message. A given execution information element may take on a value of either "0" or "1". A value of "0" is indicative of non-execution of a branch instruction, while a value of "1" is indicative of execution of a branch instruction.

For example, the sequence "1" indicates a reception of a single branch message indicative of execution of a branch instruction, while the sequence "101" indicates a reception of three consecutive branch messages indicative of execution of a branch instruction, non-execution of a branch instruction, and execution of a branch instruction.

The series branch identifier indicates for a given sequence of branch messages and a given branch identifier that branch identifier which corresponds to the branch instruction which will be encountered next during the execution of the program when initially the given branch identifier corresponded to that branch identifier stored as the intermediate runtime information and the given sequence of branch messages is received by the trace-data-processing device.

Thus, while the series identifier associated with the sequence "1" simply corresponds to the subsequent branch identifier of FIG. 5, the series identifier associated with the sequence "11" identifies that BID which is to be stored as the intermediate runtime information after two consecutive branch messages indicative of execution of a branch instruction are received.

Since the exemplary program represented by the table "Application" also includes an indirect branch instruction, the series branch identifier cannot be determined statically for all four sequences of branch messages for all BIDs. As a result, all those series branch identifiers corresponding to a sequence of branch messages including a message indicative of execution of the indirect branch instruction are marked with an "x". Other variants of the embodiment of the trace-data-processing device of FIG. 6 use other symbols or combination of symbols to mark an undefined series branch identifier.

In the example of FIG. 6, only sequences indicative of execution and non-execution of up to three branch messages have been included into the table "DB_LUT". However, in other embodiments, this number is smaller or larger. Furthermore, the sub-table "DB_LUT" only includes those sequences of branch messages whose initial and final branch message indicate execution ("1"). This is advantageous to save memory, since the effect on the intermediate runtime information caused by an initial or trailing "0" of a sequence of branch messages can be calculated by an increment and without access to the table "DB_LUT". However, other variants of the embodiment of the trace-data-processing device of FIG. 6 also include sequences of branch messages that start or end with a branch message indicative of non-execution of a branch instruction.

An example of how the series branch identifiers are used for the processing of a trace-data stream is shown in a lower part of FIG. 6. The exemplary trace-data stream shown on the left-hand side of the lower part of FIG. 6 is identical to the trace-data stream depicted in FIG. 5 except that non-relevant trace messages (indicated by "(other msg.)") have been removed.

In the example given in the lower part of FIG. 6, the trace-data-processing unit attempts to process the branch messages in blocks of three, if it is advantageous. This is, for example, illustrated by the curly bracket that spans the fifth, sixth, and seventh trace message, which correspond to the "101" sequence of branch messages. To process this block of trace messages, the trace-data-processing unit performs a read operation indicated by the operation "read DB_LUT [4]", wherein the entire row corresponding to the BID "4" of the sub-table "DB_LUT" is retrieved.

Afterwards, the trace-data-processing unit performs three steps to iteratively update the intermediate runtime information.

In a first step, the trace-data-processing unit 1204 processes the fifth trace message by updating the intermediate runtime information using the series identifier corresponding to the series "1" from the retrieved row of the sub-table "DB_LUT", which is indicated by the operation "DB_LUT [4].nBID[1]". As a result, the intermediate runtime information gets updated from BID "4" to BID "3".

In a second step, the trace-data-processing unit processes the sixth trace message by incrementing the intermediate runtime information from BID "3" to BID "4", which is indicated by the operation "Increment nBID".

In a third and final step, the trace-data-processing unit processes the seventh trace message by updating the intermediate runtime information using the series identifier corresponding to the series "101" from the retrieved row of sub-table "DB_LUT", which is indicated by the operation "DB_LUT[4].nBID[101]". As a result, the intermediate runtime information is updated from BID "4" to BID "3". Consequently, the trace-data-processing unit was able to process three trace messages with just a single memory access.

After the block of three trace messages is processed, a block of two trace messages is processed, which is illustrated by the curly bracket that spans the eighth and ninth trace message. The reason that the trace-data-processing unit only processed a sequence of two branch messages instead of the possible sequence of three branch messages is that the tenth branch message corresponds to an indirect branch instruction for which a series branch identifier cannot be statically be determined.

The eighth and ninth trace messages correspond to a "10" sequence of branch messages. To process this block of trace messages, the trace-data-processing unit performs a read operation indicated by the operation "read DB_LUT[3]", wherein the entire row corresponding to the BID "3" of the sub-table "DB_LUT" is retrieved.

In a first step, the trace-data-processing unit 1204 processes the eighth trace message by updating the intermediate runtime information using the series identifier corresponding to the series "1" from the retrieved row of the sub-table "DB_LUT", which is indicated by the operation "DB_LUT [3].nBID[1]". As a result, the intermediate runtime information is updated from BID "3" to BID "1".

In a second step, the trace-data-processing unit 1204 processes the ninth trace message by incrementing the intermediate runtime information from BID "1" to BID "2", which is indicated by the operation "Increment nBID".

The runtime information data generated by the trace-data-processing unit open up a wide range of applications. An example for one such application is a code-coverage analysis, which will be described with reference to FIG. 7A.

Figure 7A:
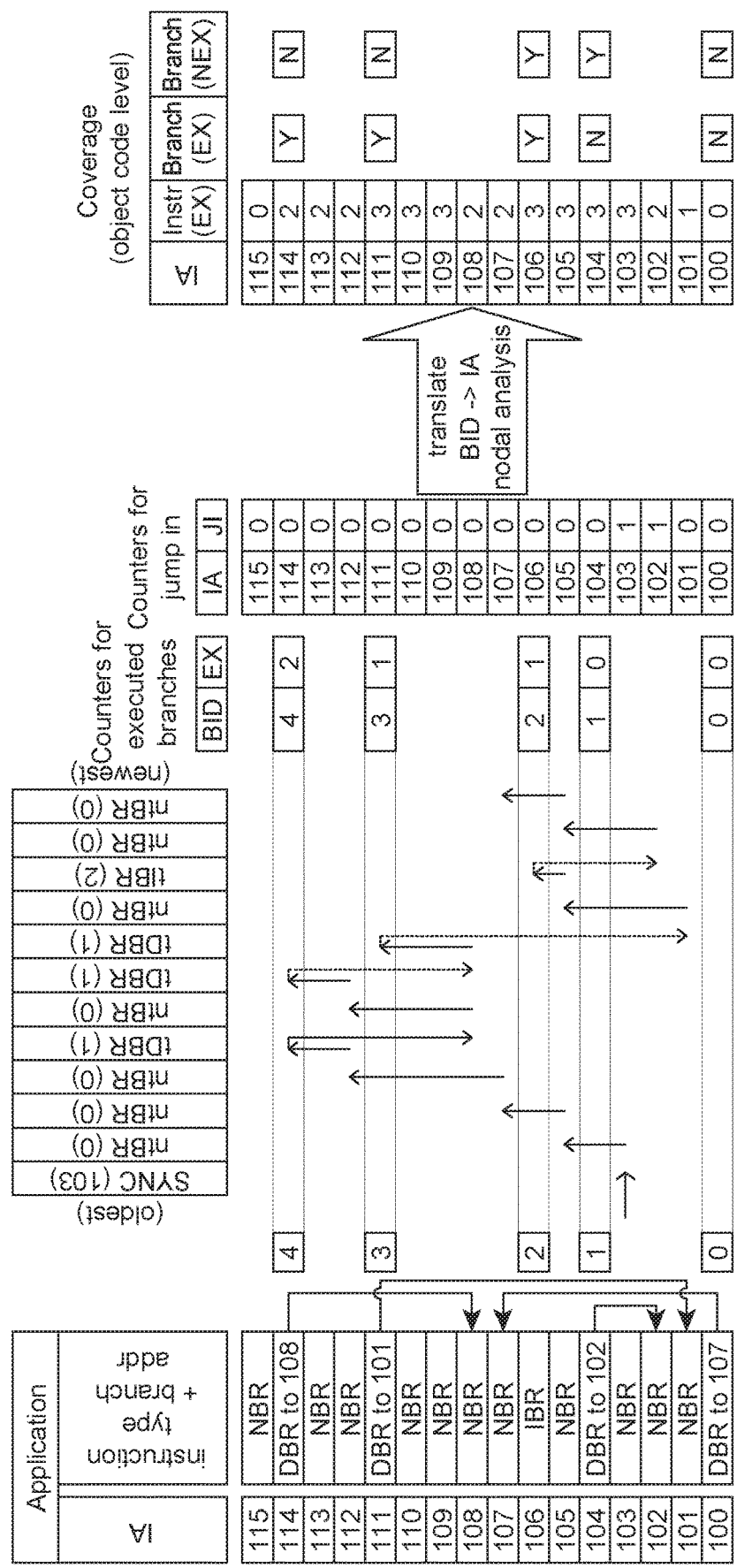
FIG. 7A shows an example of branch identifiers being used for a code coverage analysis.

FIG. 7A shows an example of branch identifiers being used for a code-coverage analysis.

Code-coverage analysis is a measure used to describe the degree to which the source code of a program is executed during a test run. A program with a high code coverage has had more of its source code executed during testing, which suggests it has a lower chance of containing undetected software bugs compared to a program with low test coverage. The execution flow reconstruction performed by the trace-data-processing device can be used to determine the code coverage of a program during a test run. FIG. 7A shows an example of a code-coverage analysis performed for a single execution of an exemplary test program.

In the left-most part of FIG. 7A, a table labeled "Application" is a representation of the test program executed by the DUT 102, which is identical to the tables "Application" of FIGS. 5-6. The test program comprises 15 instructions identified by instruction addresses "100"-"115" shown in a column labeled "IA" of the table "Application". In a column labeled "Instruction type+branch addr", an instruction type is listed for each instruction address. The instruction type identifies an instruction either as a direct branch instruction ("DBR"), an indirect branch instruction ("IBR"), and a non-branch instruction ("NBR"). If an instruction is a direct branch instruction, the column "instruction type+branch addr" also indicates a jump-in address of the direct branch instruction. In addition to the jump-in address, arrows leading from the instruction address of the direct branch instruction to the respective jump-in address serve as an additional visual guide to represent the change in execution flow as a result of execution of a given direct branch instruction.

To perform the program flow reconstruction of the test program, a unique branch identifier is assigned to each branch instruction as is indicated in a table labeled "given ID", which uniquely associates a branch identifier to each branch instruction. The branch identifiers range from "0"-"4" and are associated to the branch instructions in ascending order corresponding to the execution direction of the test program.

To the right from the table "Application" and the table "given ID", FIG. 7A shows an exemplary trace-data stream indicative of the execution flow during the execution of the test program by the DUT 102. The trace-data stream starts with an instruction-synchronization message ("SYNC") indicative of an instruction address "103", where the execution of the program initially starts. The instruction synchronization message is followed by a series of branch messages either indicative of non-execution of a branch instruction ("ntBR"), execution of a direct branch instruction ("tDBR"), and execution of an indirect branch instruction ("tIBR"). Depending on the trace architecture of the DUT 102, trace-data stream may also include other messages. However, these messages are not relevant for the code-coverage analysis and are therefore not considered.

Each trace message is indicative of a part of the execution flow of the test program. To illustrate the respective part of the execution flow for the exemplary run of the test program, a schematic drawing representing the part of the execution flow for each trace message is shown beneath the trace-data stream. In this schematic drawing, arrows beneath each trace message connecting two instruction addresses of the table "Application" are used to represent the part execution flow indicated by the respective trace message, wherein a solid arrow indicates a sequential execution of instructions and a dashed arrow indicates a change in the sequential order of execution due to the execution of a branch instruction.

Moreover, two tables labeled "Counters for executed branches" and "Counters for jump in" are shown to the right of the trace-data stream. These two tables show for the exemplary run of the test program which information is collected from the execution flow reconstruction performed by the trace-data-processing device for the code-coverage analysis.

In the table labeled "Counters for executed branches", a column labeled "BID" lists all the branch identifiers comprised within the program. Furthermore, a column labeled "EX" holds a counter value for each branch identifier, which is indicative of the number of times the branch instruction with the respective branch identifier was executed. All counter values are initially set to zero. In the course of an online monitoring code-coverage analysis, each counter is incremented whenever the trace-data-processing device reports the execution of the corresponding branch instruction. The table indicates that the direct branch instruction with the branch identifier "4" was executed twice, the direct branch instruction with the branch identifier "3" was executed once, the indirect branch instruction with the branch identifier "2" was executed twice and the direct branch instruction with the branch identifiers "1" and "0" were never executed.

For direct branch instructions, the jump-in address is known from the object code and, therefore, the jump-in address has not to be monitored separately. However, for indirect branch instructions, the jump-in address is computed dynamically in the course of the program execution. Therefore, the table labeled "Counters for jump in" is implemented and maintained, which records the number of jump-ins for each instruction address as a result of an executed indirect branch instruction. The test program only comprises a single indirect branch instruction (corresponding to branch identifier 2), which was executed during the test run only once. The jump-in address "102" corresponding to the single execution of the indirect branch instruction is marked with a "1" in the table labeled "Counters for jump in".

In addition to the jump-in instruction addresses associated to indirect branch instructions, the initial instruction address for the execution of the test program has to be recorded for the code-coverage analysis. In this example, the initial instruction address is recorded by incrementing the counter value of the respective instruction address "103" in the table "Counters for Jump In". In other variants of the code-coverage analysis, the initial instruction address is recorded in a separate table.

Retrieving both counter tables after the online monitoring yields conclusive data about the non-sequential control flow contributions at each instruction address consisting of jump-outs performed by a branch and of jump-ins both implied at direct branch target addresses and directly recorded for indirect branch target addresses. With this data, a nodal analysis through the program instruction address space can be performed. The addition of all non-sequential jump-in contribution immediately yields the observed execution count of the instruction at the considered address. The subtraction of all jump-outs from this address produces the sequential control-flow contribution to the next instruction, which is analyzed analogously. In the end, the exact execution count for each program instruction during the monitored run is determined. Additionally, for each branch instruction, it can be determined whether it was ever taken (its jump-out counter is greater than zero) and whether it was ever not taken (its execution count minus its jump-out counter is greater than zero) during the monitored run. This information can be used to calculate, among others, the commonly used test coverage metrics statement coverage and branch coverage as is shown in a table labeled "Coverage".

The table labeled "Coverage" comprises four columns labeled "IA", "Instr (EX)", "Branch (EX)", and "Branch (NEX)". The number given in the column labeled "Instr (EX)" is indicative of the number of times that an instruction corresponding to the respective instruction address given in the column labeled "IA" was executed during the execution of the test program. Furthermore, the column labeled "Branch (EX)" indicates for each branch instruction comprised within the program if it was at least once executed ("Y"), while the column labeled "NEX" indicates if the branch instruction was at least once not executed. For the single run of the exemplary test program, it can be seen that only the branch instruction with the branch identifier "2" was executed and not-executed at least once. To thoroughly test all other branch instructions further test runs are required. Moreover, the column labeled "Instr (EX)" indicates that the instruction with the instruction address "100" was never executed. This also indicates a need for further testing.

In view of the program flow reconstruction as presented in the FIGS. 4-6, what is usually observed during a code-coverage analysis is that a program spends most of its time executing loops (e.g. for-loops or while-loops), which cause repeating patterns of BIDs. Using loop detection, the number of memory accesses and the processing time required for the program flow reconstruction can, on average, be considerably reduced, which also decreases the power consumption (and possible thermal problems). Moreover, using loop detection and its statistical effect, the degree of parallelization of the program flow reconstruction can be reduced, while the required time remains constant. In the following, a preferred embodiment of the trace-data-processing device which is configured to perform the loop detection will be described with reference to FIG. 7B.

Figure 7B:
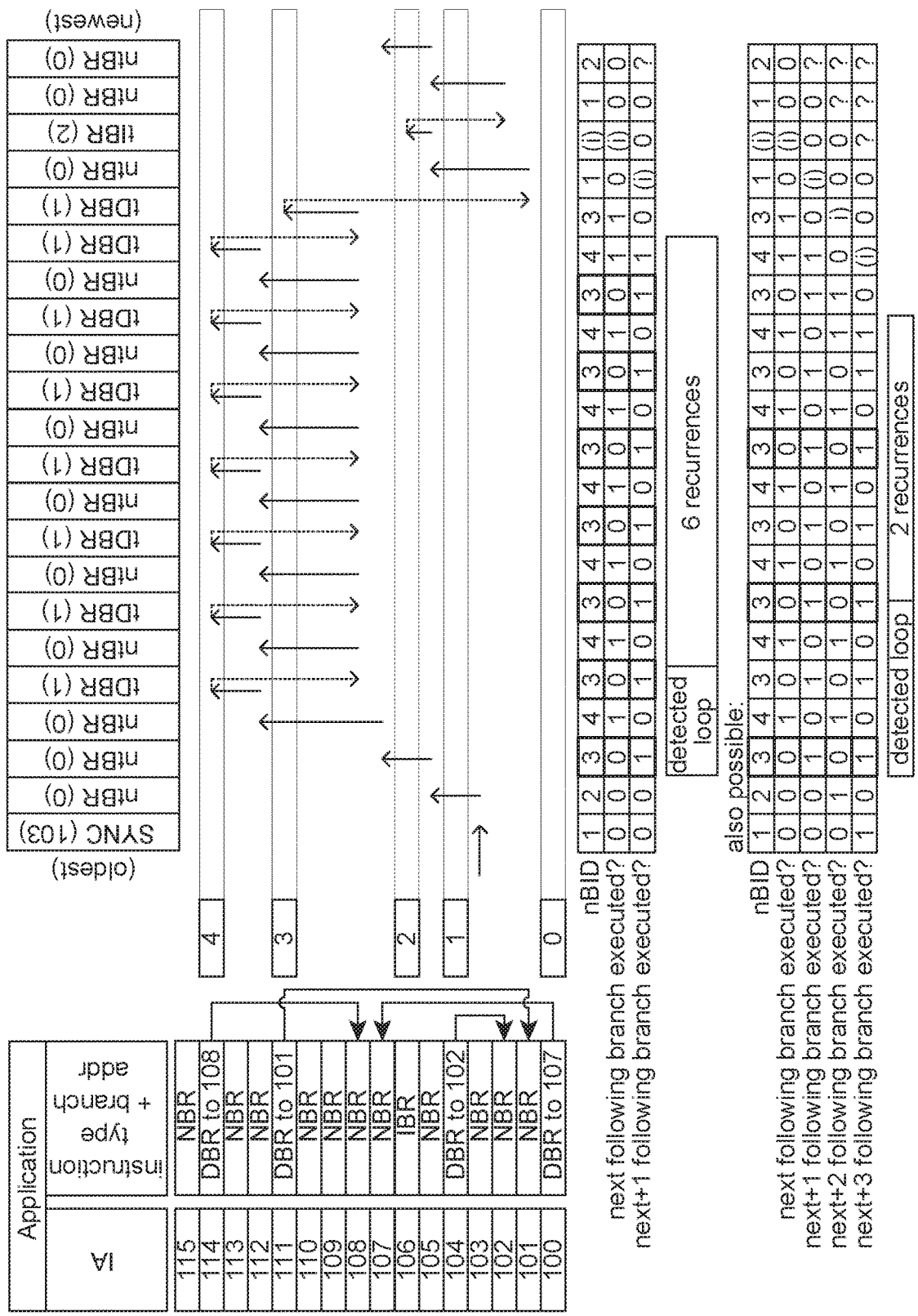
FIG. 7B shows an example of branch identifiers being used in combination with loop detection.

FIG. 7B shows an example of branch identifiers being used in combination with loop detection.

FIG. 7B is separated into an upper and a lower part. On a left-hand side of the upper part of FIG. 7B, a representation of an exemplary program run by the DUT 102 is shown in form of a table labeled "Application", which is identical to the table "Application" of FIG. 7A. Furthermore, on a right-hand side of the upper part of FIG. 7B, an exemplary trace-data stream running from left to right is shown, wherein the leftmost trace message is received first by the trace-data processing device, while the rightmost trace message is received last. Below each trace message, an arrow represents the execution flow described by the trace message with respect to the instruction addresses of the table "Application", similar to the illustration of FIG. 7A. As is the case for the trace-data stream shown in FIG. 7A, the exemplary trace-data stream shown in FIG. 7B only comprises those trace messages which are required for the program flow reconstruction. If a trace-data stream includes other messages (e.g. NOP messages), they are ignored by the trace-data-processing unit for the program flow reconstruction and loop detection.

As can be seen from the arrows beneath the exemplary trace-data stream, starting from the fourth trace message, the execution of the program by the DUT 102 enters a loop, wherein a single loop iteration comprises non-execution of the direct branch instruction associated with BID "3" and execution of the direct branch instruction associated with BID "4". The loop is executed 7 consecutive times by the DUT 102.

Using the program flow reconstruction as described with regard to FIG. 5, one table look-up is required for each branch message indicative of execution of a direct branch instruction. With regard to FIG. 6, the required number of table look-ups can be reduced by using series branch identifiers. However, even when using series branch identifiers, the number of memory accesses still scales linearly with the number of branch messages. For those branch messages which were generated as a result of the execution of a loop, the number of required memory accesses can be further reduced using loop detection. The concept of loop detection will be explained in the following.

To detect loop iterations within the trace-data stream, the embodiment of the trace-data-processing device of FIG. 7B is configured to identify within the trace-data stream any two consecutive sequences of direct branch messages that
  (i) comprise an identical sequence of branch messages, referred to as loop-message sequence, indicative of execution or non-execution of direct branch instructions and that
  (ii) produce an identical sequence of branch identifiers, referred to as loop-identifier sequence.

Upon identification of a loop-message sequence, the trace-data-processing unit is additionally configured to determine the sequence of branch identifiers of any loop messages that consecutively follow the two identified loop-message sequences using the loop-identifier sequence. In this way, the BIDs corresponding to the consecutively following loop-message sequences do not have to be determined through one or more memory accesses but can be "replayed" using the cached loop-identifier sequence.

Whether or not two consecutive sequences of direct branch messages produce an identical sequence of branch identifiers can be determined using various approaches, wherein FIG. 7B displays only one of those approaches.

In the lower part of FIG. 7B two tables are shown, which illustrate exemplary implementations of loop detection for loop-message sequences of length two and four, respectively. The columns of both tables are aligned with the trace-data stream starting with the first branch message ("ntBR"). In the first row of each table, that branch identifier is given which is stored as the intermediate runtime information when the respective branch message is received by the trace-data-processing device. The two or four rows below each BID correspond to that sequence of branch messages comprising the respective branch message and the following one or three branch messages received by the trace-data-processing device, respectively, for the upper or lower table. As for the sequence of branch messages shown in FIG. 6, "0" indicates that a branch instruction was not executed, while "1" indicates that a direct branch instruction was executed. Furthermore, "(i)" identifies a trace message indicative of execution of an indirect branch instruction, while "?" indicates that no trace message is available, e.g. due to the finite length of the trace-data stream.

The trace-data-processing units corresponding to the upper and lower table of FIG. 7B are configured to perform the program flow reconstruction analogously to one of the methods described with reference to FIGS. 4-6. However, the program flow reconstruction is performed in a delayed manner such that when a given branch message is about to be processed at least the one following (upper table) or the three following (lower table) trace messages have already been received by the trace-data-processing device. Furthermore, the trace-data-processing device is configured to perform two additional steps before processing the given branch message.

In a first step, the trace-data-processing unit fills that column of the upper or lower table with the corresponding branch identifier and corresponding sequence of two (upper table) or four (lower table) branch messages. In a subsequent step, the trace-data-processing unit compares the just filled column of the table with the third last (upper table) or fifth last (lower table) column. If the two columns are identical, it means that (i) the first branch identifier of two consecutive sequences of branch messages of length two are identical, and that (ii) the two consecutive sequences of branch messages themselves are identical. Consequently, also the branch identifiers corresponding to the remaining branch messages in the sequence of branch messages have to be identical for both sequences of branch messages.

If two such identical columns are identified, the processing of the given branch message is not performed according to the methods described with reference to FIGS. 4-6. Instead, the trace-data-processing device is configured to "replay" the branch identifiers corresponding to the first sequence of the branch messages for the first recurrence as well as for all following recurrences. In the following, the concrete examples given in the upper and lower tables of the lower part of FIG. 7B will be discussed.

In the example, shown in the upper table, the trace-data-processing unit performs the program flow reconstruction according to one of the methods described with reference to FIGS. 4-6 for the first five trace messages of the exemplary trace-data stream. Before the sixth message is processed, the trace-data-processing unit compares the fifth and the third column of the upper table of FIG. 7B and finds that the BID "3" stored as the intermediate branch identifier as well as the sequence of branch messages "01" are identical. As a result, the trace-data-processing stops the processing of the trace messages according to FIGS. 4-6 and, instead, replays the sequence of branch identifiers "4" and "3" for the seventh and eighth trace message. Since also the seventh, ninth, eleventh, thirteenth, and fifteenth column are identical to the third and fifth column, also for those columns the sequence of branch identifiers "4" and "3" is replayed. The loop-message sequence of in this example is "01" while the loop-identifier sequence is "3" and "4". Replaying of the branch identifiers stops with the eighteenth branch message, for which the sequence of branch messages no longer equals "01", but "10".

In the example, shown in the lower table of FIG. 7B, the trace-data-processing unit performs the program flow reconstruction according to one of the methods described with reference to FIGS. 4-6 for the first seven trace messages of the exemplary trace-data stream. Before the eighth message is processed, the trace-data-processing unit compares the seventh and the third column of the lower table of FIG. 7B and finds that the BID "3" stored as the intermediate branch identifier as well as the sequence of branch messages "0101" are identical. As a result, the trace-data-processing stops the processing of the trace messages according to FIGS. 4-6 and, instead, replays the sequence of branch identifiers "4", "3", "4" and "3" for the eighth to eleventh trace message. Since also the eleventh column is identical to the third column, also for this column the sequence of branch identifiers "4", "3", "4" and "3" is replayed. The loop-message sequence of in this example is "0101" while the loop-identifier sequence is "3", "4", "3" and "4". Replaying of the branch identifiers stops with the sixteenth branch message, for which the sequence of branch messages no longer equals "0101", but "0110".

The example of the upper and the lower table of the lower part of FIG. 7B illustrate the advantage of loop detection. Using loop detection, the intermediate runtime information for 12, respectively, 8 branch messages could simply be replayed without having to perform any memory accesses.

The implementations illustrated with regard to the upper and lower table of the lower part of FIG. 7B are only examples. Other embodiments of the trace-data-processing device perform loop detection for lengths of loop-message sequences different from two and four. Yet other embodiment of the trace-data-processing device perform loop detection for different lengths of loop-messages in parallel. Yet other variants of the trace-data-processing device use a modified algorithm to perform loop detection. Modification of the algorithm include that not the entire table as illustrated in the lower part of FIG. 7B is stored, but only those parts of the table that is required for the comparison with the most recently added columns.

Moreover, other embodiments of the trace-data-processing device are also configured to include branch messages indicative of non-execution of indirect branch instructions into the loop-message sequence. Since the jump-in address of indirect branch instructions are unknown at compile time, those variants are also configured to terminate the loop detection, when a branch message indicative of execution of an indirect branch instruction is received.

Furthermore, other embodiments of the trace-data-processing device are configured to separately capture and store time information associated to the branch messages and include the time information. For the case that the tokens contain timestamps, the timestamps of the received trace data stream are captured and patched into the generated token stream appropriately.

The methods of program flow reconstruction described with reference to FIGS. 4-7B are all restricted to the observation of execution or non-execution of branch instructions. However, in some situations it is also relevant to know more about execution or non-execution of instructions at arbitrary instruction addresses. For example, in a situation where two processes are executed in parallel and one performs a read operation and the other a write operation to the same memory it can be relevant to find out if the read or write operation has occurred before an exception thrown during the execution of the program.

Embodiments of the trace-data-processing device that are able to also observe the execution or non-execution of instruction at arbitrary instruction address are described in the following with reference to FIGS. 8-11.

Figure 8:
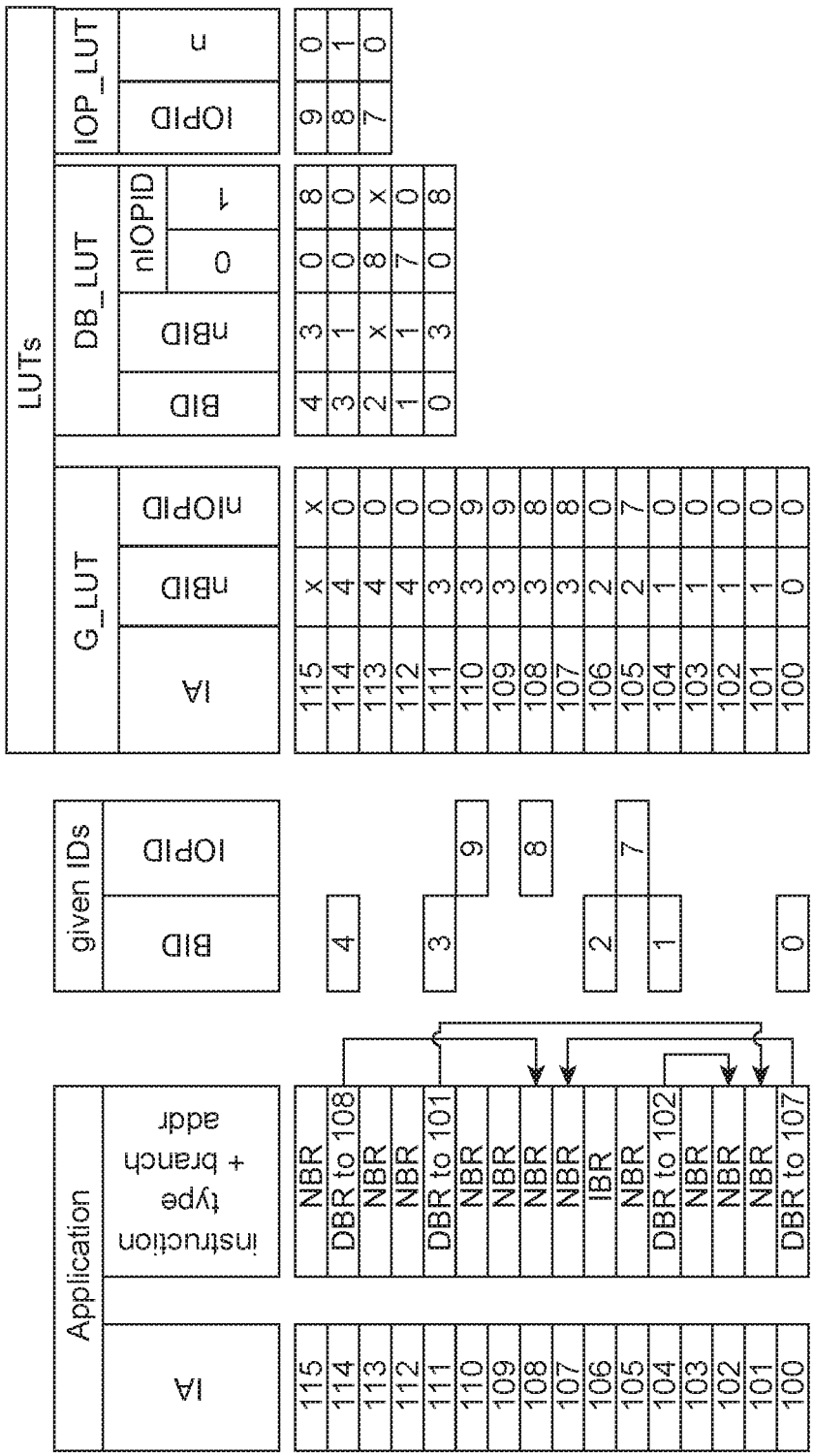
FIG. 8 shows an example of a program flow reconstruction based on branch identifiers and instruction observation points (IOP)
Figure 8:
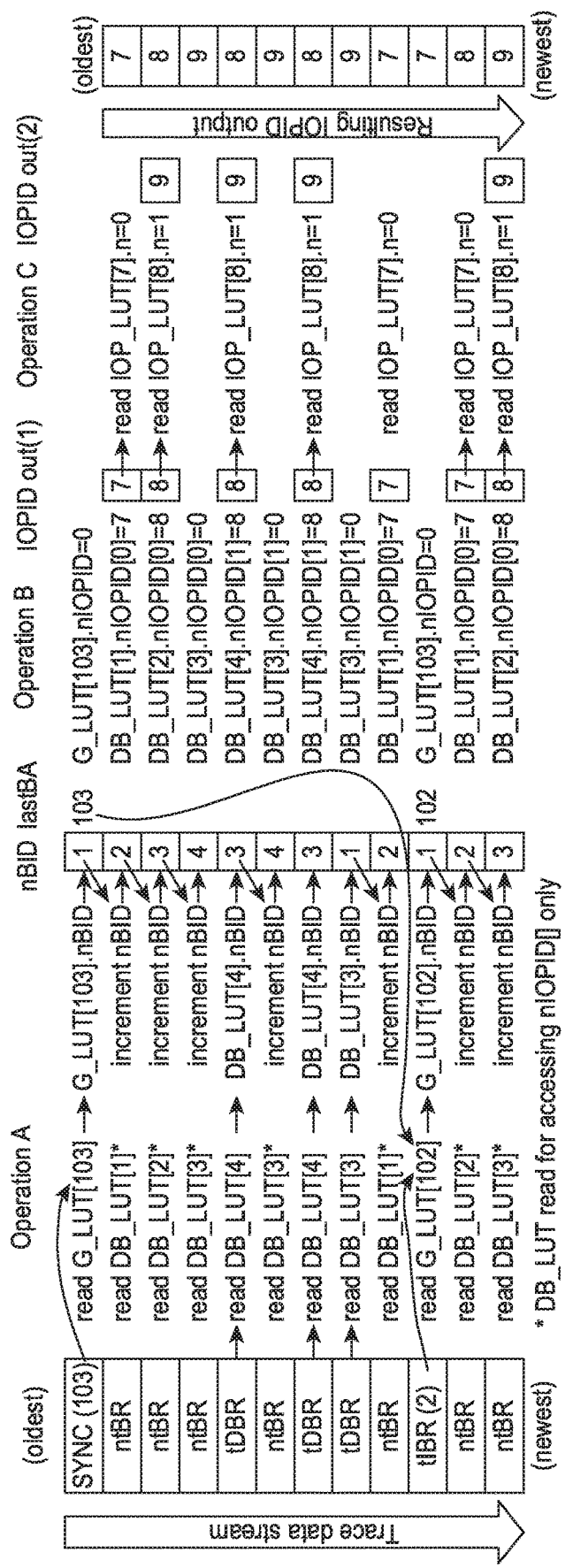

FIG. 8 shows an example of a program flow reconstruction based on branch identifiers and instruction observation points (IOP).

For some applications, it is necessary to observe the execution of instructions at arbitrary addresses. Such observations of instructions at arbitrary instruction address can be performed using instruction observation points. An embodiment of the trace-data-processing device that uses IOPs during the program flow reconstruction is described with reference to FIG. 8.

Identically to FIG. 5, FIG. 8 is separated into an upper and a lower part. In the upper part of FIG. 8, the tables "Application", "given ID", and "LUT" are shown, while in the lower part of FIG. 8, an example of how the trace-data processing unit 1204 uses the information given in the upper part to process an exemplary trace-data stream is shown.

The table "Application" shown in the upper part of FIG. 8 is identical to the table "Application" of FIG. 5. Only additionally, the instruction addresses "105", "108" and "110" are marked with a grey background. In the given example, the instructions associated to those marked instruction addresses are of particular relevance and are therefore marked with an instruction observation point identifier, hereinafter also referred to as IOP identifier. The IOP identifiers are given in the table "given IDs" in an additional column labeled "IOPID", which allocates to the instruction addresses "105", "108", and "110" the IOP identifiers "7", "8", and "9", respectively.

Information about the IOPs is additionally included into the table "LUTs". In comparison to the earlier representations of the sub-table "G_LUT" of FIGS. 4-6, the sub-table "G_LUT" shown in FIG. 8 additionally comprises a column labeled "nIOPID". The column "nIOPID" of the sub-table "G_LUT" allocates to each instruction address a next IOP identifier, wherein the next IOP identifier is that IOP identifier whose instruction address is located closest to or directly at an instruction address under consideration and whose instruction address is located in an interval between the instruction address under consideration and a branch instruction address located closest to the instruction address under consideration in the execution direction of the program. For the instruction address "105", the next IOP identifier is "7", since the IOP identifier "7" is associated to the instruction address "105" itself and, consequently, is encountered during the program execution before the next branch instruction, which is the indirect branch instruction at the instruction address "106", is encountered. Similarly, it can be seen from the table "Application" that for the instruction addresses "107" and "108" the next IOP identifier is "8" and for the instruction addresses "109" and "110" the next IOP identifier is "9". If no next IOP identifier is associated with an instruction address, in this example, the next IOP identifier is set to zero. However, in other embodiments of the trace-data processing device another symbol or combination of symbols is used.

In comparison to the earlier representations of the sub-table "G_LUT" of FIGS. 4-6, the sub-table "DB_LUT" comprises an additional column labeled "nIOPID", which comprises two sub-columns labeled "0" and "1". The sub-column "0" allocates to each branch identifier a first subsequent IOP identifier. The first subsequent IOP identifier is that IOP identifier, if any, whose instruction address is located closest to or directly at a branch instruction address of a branch identifier under consideration and whose instruction address is located in an interval between the branch instruction address of the branch identifier under consideration and a branch instruction address located closest to the branch instruction address of the branch identifier under consideration in the execution direction. The sub-column "1" allocates to each branch identifier a second subsequent IOP identifier. The second subsequent IOP identifier is that IOP identifier if any whose instruction address is located closest to or directly at a jump-in address of a branch identifier under consideration and whose instruction address is located in an interval between the jump-in address of the branch identifier under consideration and a branch instruction address located closest to the jump-in address of the branch identifier under consideration in the execution direction.

For example, for the case of the exemplary program given in the table "Application", the first subsequent IOP identifier allocated to the BID "0" is "0", since there is no IOP located between the direct branch instruction at instruction address "100" and the next branch instruction in the execution direction of the program, which is the direct branch instruction at the instruction address "104". Yet, the second subsequent IOP identifier allocated to the BID "0" is the IOP identifier "8", since the IOP associated with IOP identifier "8" is located at the instruction address "108" and, thus, is the first IOP that is encountered after the direct branch instruction associated with the branch identifier "0" is executed and any other branch instruction is encountered. Similarly, the first and the second subsequent IOP identifiers for the remaining branch IDs can be determined. In other embodiments of the trace-data-processing device, a symbol different from "0" is used to indicate that no IOP corresponding to the first or second subsequent IOP identifier.

The second subsequent IOP identifier associated with the BID "2" is marked with an "x". An "x" is used to mark those second subsequent IOP identifiers that cannot be determined. However, other embodiments of the trace-data-processing device use other symbols to mark an invalid second subsequent IOP identifier.

Furthermore, the table "LUTs" of FIG. 8 comprises an additional sub-table labeled "IOP_LUT". The sub-table "IOP_LUT" comprises two columns labeled "IOPID" and "n". The column "n" of the sub-table "IOP_LUT" associates to a given IOP identifier a number "n" which corresponds to the number of IOP identifiers that will be encountered during the execution of the program starting from the instruction address associated with the given IOP identifier until the next branch instruction in the execution direction is encountered. For the IOP identifiers "7" and "9", the number "n" is zero, since the instructions associated with those IOP identifiers are immediately followed by an indirect branch instruction at instruction address "106" and a direct branch instruction at the instruction address "111", respectively. However, for the IOP identifier "8", the number "n" is "1", since the instruction observation point associated with IOP identifier "9" at the instruction address "110" lies between the instruction at instruction address "108" associated with the IOP identifier "8" and the next branch instruction at instruction address "111".

The lower part of FIG. 8 shows on the left-hand side an exemplary trace-data stream that is produced during the execution of the program of the table "Application". The trace-data stream is identical to the trace-data stream shown in FIG. 5, wherein the trace-data stream of FIG. 8 is reduced to only those messages that are relevant for the program flow reconstruction.

Moreover, FIG. 8 also shows the columns "Operation A", "nBID", and "lastBA" to the right of the exemplary trace-data stream. The three columns all are relevant in the determination of the BIDs stored as the intermediate runtime information. Since the exemplary trace-data stream of FIG. 8 is identical to the exemplary trace-data stream of FIG. 5, the columns "Operation A", "nBID", and "lastBA" are identical to those shown in FIG. 5. The only difference is that the column "Operation A" lists additional operations marked with an asterisk, whose meaning will be described further below.

Further differences between the embodiment of the trace-data-processing device of FIG. 8 and that shown in FIG. 5 are illustrated in the columns to the right of the column "lastBA".

To process the exemplary trace-data stream, the embodiment of the trace-data-processing device of FIG. 8 executes additional operations listed in the columns labeled "Operation B" and "Operation C" to additionally determine from the trace-data stream those IOP identifiers associated to instructions that will be executed before the next branch instruction is executed by the DUT 102. The determination of those IOP identifiers is performed in two steps.

In a first step, depending on if the trace-data-processing device received an instruction-synchronization message or a branch message, the trace-data-processing unit determines either the respective next IOP identifier or the respective subsequent IOP identifier. The corresponding operations are listed in the column "Operation B". The determined IOP identifier of the first step, if any, is given in a column labeled "IOPID out(1)".

In a second step, the trace-data-processing unit determines the remaining of those IOP identifiers associated to instructions that will be executed before the next branch instruction is encountered by the DUT 102 using the respective next IOP identifier or the respective subsequent IOP identifier and the sub-table "IOP_LUT". The corresponding operations are listed in the column "Operation C". A determined IOP identifiers of the second step, if any, is given in a column labeled "IOPID out(2)". The entire sequence of determined IOP identifiers is shown in form of a stream of IOP identifiers on the very right of the lower part of FIG. 8, wherein an arrow labeled "Resulting IOPID output" indicates the direct of the output of the determined IOP identifiers from the oldest to the newest. A more detailed description of the operations executed to process the trace messages comprised in the exemplary trace-data stream and determine any relevant IOP identifiers will be given in the following.

As has already been described with regard to FIG. 5, the first trace message of the trace-data stream is an instruction-synchronization message indicative of the instruction address "103". In response to the instruction-synchronization message, the trace-data-processing unit performs a read operation of the sub-table "G_LUT" to determine the next branch identifier associated to the instruction address "103" as is indicated by the operations "read G_LUT[103]" and "G_LUT[103].nBID" of the column "Operation A". Using the retrieved information from the sub-table "G_LUT" associated to the instruction address "103", the trace-data-processing unit of the embodiment of FIG. 8 additionally determines the next IOP identifier associated to the instruction address "103" as is indicated by the operation "G_LUT [103].nIOPID=0". Since no next IOP identifier is associated with the instruction address "103", the columns "IOPID out(1)", "Operation C", and "IOPID out(2)" are empty.

The second trace message received by the trace-data-processing device of FIG. 8 is a "ntBR"-message indicative of non-execution of a branch instruction. As already described with regard to FIG. 5, the intermediate runtime information is updated by incrementing the branch identifier stored as the intermediate runtime information, which is represented by the operation "increment nBID" in the column "Operation A". A read operation is not required. However, to also determine any relevant IOP identifiers, the trace-data-processing unit of the embodiment of FIG. 8 performs a read operation to the sub-table corresponding to the BID "1" stored as the intermediate runtime information as is indicated by the operation "read DB_LUT[1]*" in the column "Operation A". Since the trace message is an "ntBR"-message, the trace-data-processing unit uses the retrieved information to determine the first subsequent IOP identifier as is indicated by the operation "DB_LUT[1].nIOPID[0]=7" in column "Operation B". Since the first subsequent IOP identifier is "7", the second row of column "IOPID out(1)" shows an entry "7". To determine any further relevant IOP identifier, the trace-data-processing unit performs a read operation of the row corresponding to the IOP identifier "7" of the sub-table "IOP_LUT". The entry "n" corresponding to the IOP identifier "7" is 0 indicating that there are no other relevant IOP identifier to be determined. As a result, the column "IOPID out(2)" remains empty and only the entry of the column "IOPID out(1)" is forwarded into the stream of IOP identifiers.

The third trace message received by the trace-data-processing device is another "ntBR"-message. Also for this trace message, a read operation of the row of the sub-table "DB_LUT" corresponding to the BID stored as the intermediate runtime information, before it is updated, is performed as indicated by the operation "read DB_LUT[2]*" in the column "Operation A". Subsequently, the operation "DB_LUT[1].nIOPID[0]=8" is used to determine from the retrieved information the first subsequent IOP identifier, which is "8". Therefore, the third row of column "IOPID out(1)" shows an entry "8". To determine any further relevant IOP identifier, the trace-data-processing unit performs a read operation of the row corresponding to the IOP identifier "8" of the sub-table "IOP_LUT". The entry "n" corresponding to the IOP identifier "8" is 1 indicating that there are is one more relevant IOP identifier to be determined. Since the IOP identifiers are assigned to the instruction addresses in ascending order with the execution direction of the program, the remaining relevant IOP identifier is "9". As a result, the third row of the column "IOPID out(2)" shows a "9". Consequently, the IOP identifier "8" and "9" are included into the stream of IOP identifiers. In a last example, the processing of the first "tDBR"-message in the trace-data stream will be discussed.

To determine the intermediate runtime information in response to the reception of the first "tDBR"-message comprised in the trace-data stream, the trace-data-processing unit performs a read operation of the row corresponding to the BID "4" of the sub-table "LUTs" as is indicated by the operation "read DB_LUT[4]" in the column "Operation A". Besides the determination of the BID which is to be stored as the intermediate runtime information, the retrieved information is also used to determine the second subsequent IOP identifier, which is indicated by the operation "DB_LUT[4] .nIOPID[1]=8" listed in column "Operation B". Since the second subsequent IOP identifier is "8", the column "IOPID out(1)" also lists an entry "8" in the corresponding row. To determine any further relevant IOP identifiers, the trace-data-processing unit of the embodiment of FIG. 8 performs a read operation to retrieve the row corresponding to IOP identifier "8" of the sub-table "IOP_LUT" as is indicated by the operation "read IOP_LUT[8].n=1" in the column "Operation C". Since the column "n" of the retrieved row contains a "1", one further relevant IOP identifier has to be determined. Due to the order of the assignment of the IOP identifier, the further relevant IOP identifier is the IOP identifier "9", which is also listed in the column "IOPID out(2)". Both, the IOP identifier "8" and the IOP identifier "9" are included into the stream of IOP identifiers. The determination of the relevant IOP identifier for the remaining trace messages is performed analogously.

During the execution of the program of the table "Application" by the DUT 102, the program may generate an exception. In such a case, all IOP identifiers will be included into the runtime information data according to the table "IOP_LUT" up to the IOP identifier one below the next IOP identifier associated to the instruction address of the exception according to the sub-table "G_LUT", i.e. until "G_LUT [instruction address of exception].nIOPID-1".

In an alternative embodiment of the trace-data-processing device of FIG. 8, the sub-table "IOP_LUT" allocates to every IOP identifier that IOP identifier associated to the instruction that is encountered next during the execution of the program and that is encountered before the next branch instruction is encountered.

The use of IOP identifier has the advantage of providing additional information about the execution of instructions marked with an IOP. However, the determination of relevant IOP identifiers requires at least one read operation for every received trace message. To reduce the required memory accesses, the IOP identifiers can be combined with the series branch identifiers described with regard to FIG. 6. An embodiment of the trace-data-processing device that combines these two ideas will be described with respect to FIG. 9A.

Figure 9A:
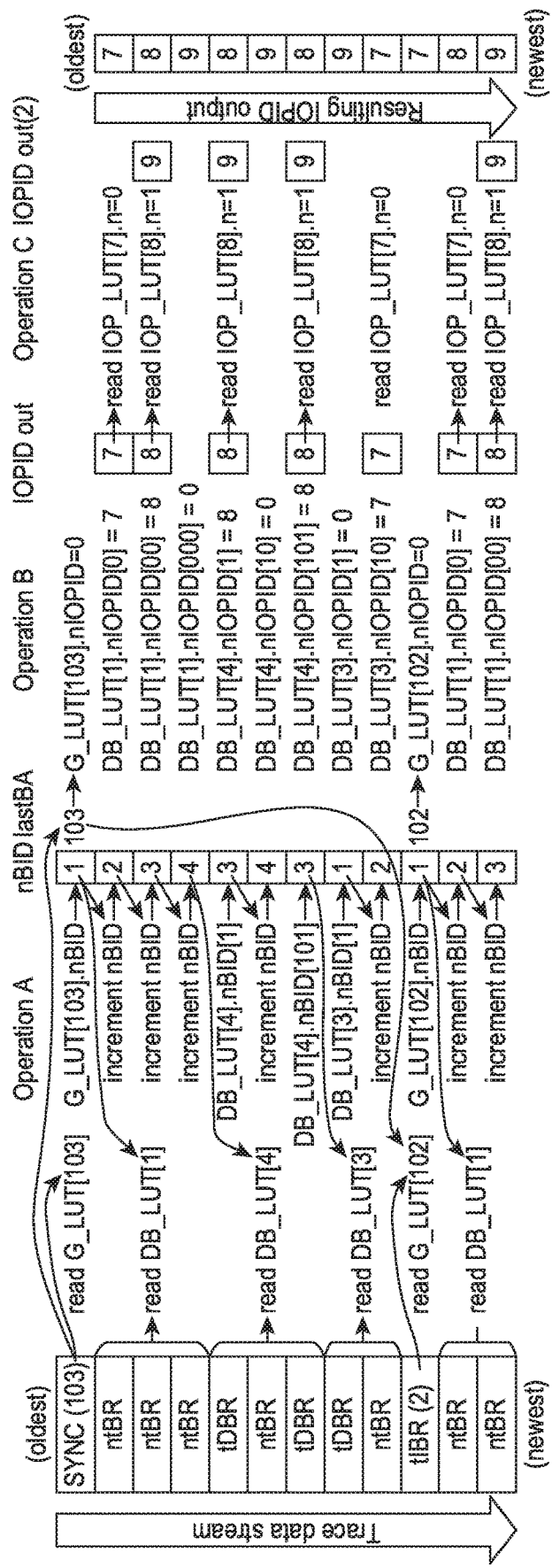
FIG. 9A shows an example of a program flow reconstruction based on branch identifiers, IOPs, and sequences of branch messages.

FIG. 9A shows an example of a program flow reconstruction based on branch identifiers, IOPs, and sequences of branch messages.

Specifically, FIG. 9A describes an embodiment of the trace-data-processing device that combines the concept of IOP identifiers with the concept of series branch identifier to reduce the amount of necessary memory accesses to the table "DB_LUT".

Analogously to the FIGS. 4-6 and FIG. 8, FIG. 9A is divided into an upper and a lower part, wherein the upper part shows the information used by the trace-data-processing device to perform the processing of a trace-data stream and the lower part shows an exemplary trace-data stream and the required operations to process the trace-data stream.

The upper part of FIG. 9A shows a table labeled "Application" showing an exemplary program executed by the DUT 102 and a table labeled "given IDs", which associates BIDs as well as IOP identifiers to selected instruction addresses. The table "Application" and the table "given IDs" are identical to those shown in FIG. 8.

Furthermore, the upper part of FIG. 9A shows a table "LUTs" comprising the sub-tables "G_LUT", "DB_LUT", and "IOP_LUT", which form the pre-stored reconstruction information of the embodiment of the trace-data-processing device of FIG. 9A. While the sub-table "G_LUT" as well as the sub-table "IOP_LUT" are identical to those of FIG. 8, the sub-table "DB_LUT" has been adapted to combine the concept of series branch identifier with IOP identifiers.

Identically to FIG. 8, the sub-table "DB_LUT" comprises three columns labeled "BID", "nBID", and "nIOPID". As in FIG. 8, the column "BID" comprises the BIDs 0-4.

However, the column "nBID" now corresponds to the column "nBID" of the sub-table "DB_LUT" of FIG. 6, which allocates to each BID and four sequences of branch messages a series branch identifier.

Moreover, the column "nIOPID" now allocates to each BID a series IOP identifier, which is that IOP identifier whose instruction address (i) in case of execution of the branch instruction of the final branch identifier, is located closest to, in the execution direction, or directly at a jump-in address of the branch instruction of the final branch identifier, and is located in an interval between the jump-in address and a branch instruction address located closest to the jump-in address of the final branch identifier in the execution direction, and (ii) in case of non-execution of the branch instruction of the final branch identifier, is located closest to in the execution direction or directly at the branch instruction address of the final branch identifier, and is located in an interval between the branch instruction address of the final branch identifier and a branch instruction address located closest to the branch instruction address of the final branch identifier in the execution direction.

Through the columns "nBID" and "DB_LUT", the pre-stored reconstruction information of the embodiment of the trace-data-processing device described in FIG. 9A allocates a series branch identifier and a series IOP identifier to a branch identifier for a sequence of branch messages including up to three branch messages. However, the number three was only chosen for exemplary purposes. Other embodiments of the described trace-data-processing device allocate the series branch identifier and the series IOP identifier also for sequences of branch messages that include a number of branch messages different from three.

The lower part of FIG. 9A shows an example of an operation of the embodiment of the trace-data-processing device shown in FIG. 9A for an exemplary trace-data stream, which is identical to that of FIG. 8. To the right of the exemplary trace-data stream, the operations performed by the trace-data-processing unit to process the trace-data stream are shown in columns labeled "Operation A", "Operation B", and "Operation C". The BIDs stored as the intermediate runtime information are listed in a column "nBID" and the IOP identifiers are listed in columns labeled "IOP out(1)", "IOP out(2)", and a stream of resulting IOP identifiers on the very right of FIG. 9A. As can be seen in comparison to FIG. 8, the operations as well as results of the operations performed by the embodiment of the trace-data-processing device of FIGS. 8 and 9A are identical except for those operations, which involve an access to the sub-table "DB_LUT". Those operations are listed in the column "Operation A" and the column "Operation B" and will be explained in more detail in the following.

The operations of column "Operation A" that are performed differently in comparison to the example shown in FIG. 8 relate to processing of branch messages. To use the advantage of the series branch identifiers and the series IOP identifiers, the embodiment of the trace-data-processing device of FIG. 9A performs a single read operation to the sub-table "DB_LUT" for three consecutive branch messages, if possible. For further illustration, the processing of the branch messages will be explained in further detail below.

The first three branch messages received by the trace-data-processing device after the instruction-synchronization message are each "ntBR"-messages and correspond to the sequence of branch messages "000". The trace-data-processing device updates the intermediate runtime information by successively incrementing the branch identifier stored as the intermediate runtime information. Nevertheless, the determination of any relevant IOP identifiers requires a read access to the table "DB_LUT". Therefore, before updating of the intermediate runtime information in response to reception of a first branch message, the trace-data-processing device performs a read operation to the sub-table "DB_LUT" to retrieve the row corresponding to the BID "1" stored as the intermediate runtime information. Subsequently, the retrieved row is used by the trace-data-processing unit to determine the respective first subsequent IOP identifier for each of the three trace messages, which correspond to the series IOP identifier "0", "00", and "000", respectively. The corresponding operations are shown in column "Operation B" indicated by the operations "DB_LUT[1].nIOPID[0]=7", "DB_LUT[1].nIOPID[00]=8", and "DB_LUT[1].nIOPID[000]=0", respectively.

The next three branch messages received by the trace-data-processing device are a "tDBR"-message, "ntBR"-message, and "tDBR"-message corresponding in combination to the sequence of branch messages "101". Both, updating the intermediate runtime information and determining relevant IOP identifiers requires read access to the table "DB_LUT", which is performed in a combined single read operation to the row corresponding to the BID "4" indicated in the column "Operation A" by the operation "read DB_LUT[4]". Subsequently, the trace-data-processing unit uses the series branch identifiers corresponding to the sequence "1" and "101" of the retrieved row to update the intermediate runtime information. Moreover, the trace-data-processing unit uses the series IOP identifier corresponding to the sequences "1", "10", and "101" of the retrieved row to determine the subsequent IOP identifier for each one of the received trace messages as indicated by the operations "DB_LUT[4].nIOPID[1]=8", "DB_LUT[4].nIOPID[10]= 0", and "DB_LUT[4].nIOPID[101]=8" in the column "Operation B", respectively.

The processing of the five remaining branch messages of the trace-data stream differs in that the third to last trace message is a "tIBR"-message for which no series branch identifiers and no series IOP identifiers are pre-computed. As a result, the trace-data-processing device first performs a read operation indicated by "read DB_LUT[3]" for the fifth and fourth to last branch message. Afterward, the respective series IOP identifiers are determined with the operations "DB_LUT[3].nIOPID[1]=0" and "DB_LUT[3].nIOPID [10]= 0". Subsequently, the "tIBR"-message is processed, followed by a combined processing of the last two branch messages comprised within the exemplary trace-data stream.

In comparison to FIG. 8, the embodiment of the trace-data-processing device of FIG. 9A requires only 4 accesses to the table "DB_LUT" while in the embodiment of FIG. 8 requires 10, which is more than double the amount.

The concept of series branch identifiers and series IOP identifiers can also be combined with the loop detection as described with regard to FIG. 7B. An embodiment of the trace-data-processing device, which is configured to process a trace-data stream using the concept of loop detection in combination with the concept of series branch identifiers and series IOP identifiers is described with reference to FIG. 9B in the following.

Figure 9B:
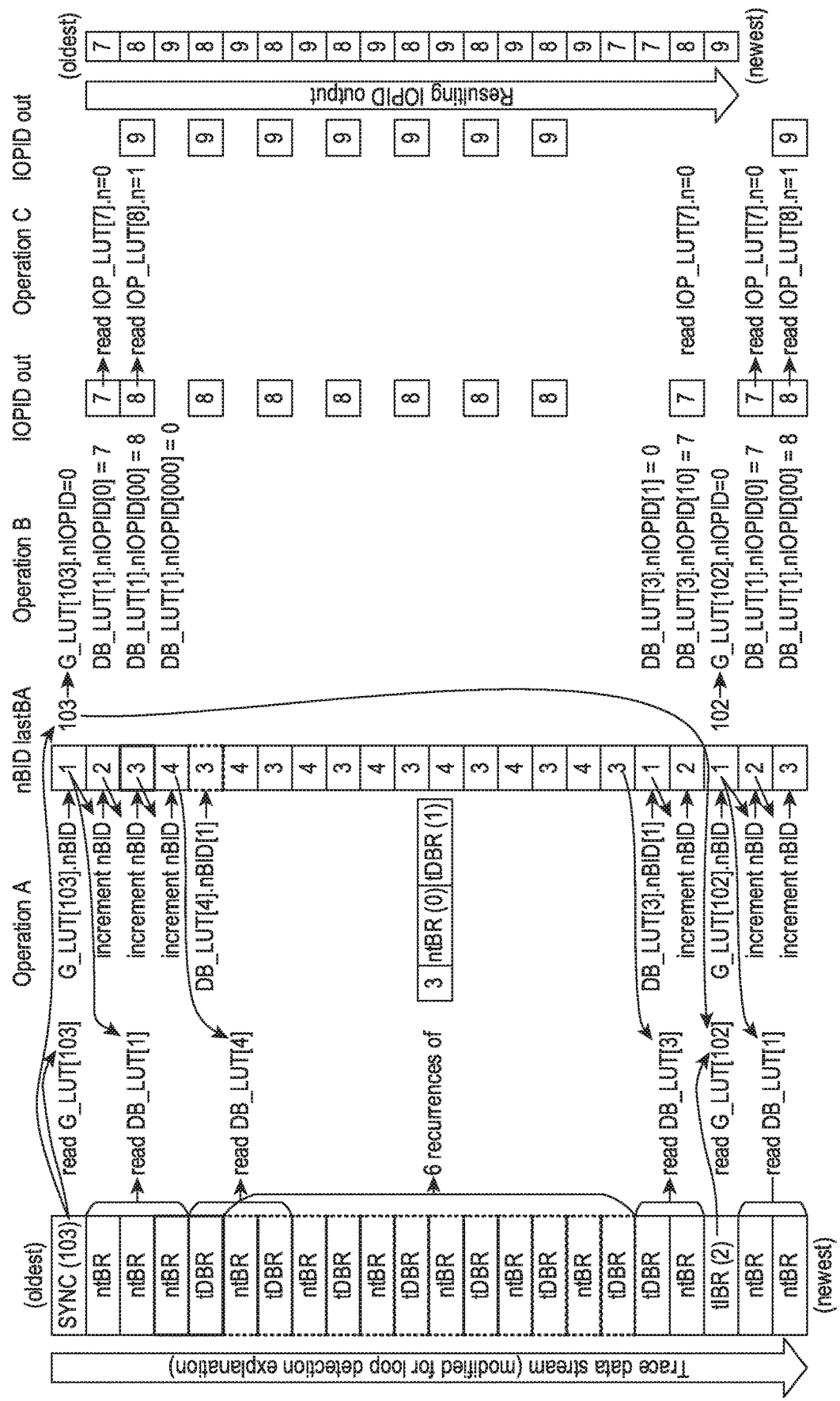
FIG. 9B shows an example of a program flow reconstruction based on branch identifiers, IOPs, sequences of branch messages, and loop detection.

FIG. 9B shows an example of a program flow reconstruction based on branch identifiers, IOPs, sequences of branch messages, and loop detection.

FIG. 9B is divided into two parts. In a first part on the first page of FIG. 9B, the three tables labeled "Application", "given IDs" and "LUTs" identically to those of FIG. 9A are shown. A second part of FIG. 9B is shown on a second page and structured identically to the lower part of FIG. 9A. On a left-hand side of the second part of FIG. 9B, an exemplary trace-data stream is shown, which illustrates a trace-data stream generated by the DUT 102 during the execution of the application given in the table "Application". In the columns "Operation A", "Operation B", and "Operation C", processing operations performed by the trace-data processing unit to process the exemplary trace-data stream are listed. Moreover, a column labeled "nBID" represents the branch identifier stored as the intermediate runtime information after processing of each trace message. Two column labeled "IOPID out(1)" and "IOPID out(2)" show the IOP identifiers included into the runtime information data after the processing of each trace message. A resulting IOP identifier output is given on a right-hand side of the second part of FIG. 9B which comprises all IOP identifiers determined by the trace-data processing unit.

The first seven and the last five trace messages of the trace-data stream shown in FIG. 9B are identical to the trace-data stream shown in FIG. 9A. For those twelve trace messages the processing steps performed by the trace-data processing units of FIG. 9B are identical to those performed by the trace-data processing unit represented in FIG. 9A.

However, the trace-data stream shown in FIG. 9B also comprises ten additional trace messages inserted between the first seven and the last five trace messages of the trace-data stream. Those ten trace messages consist of a five times continuously repeated sequence of a "ntBR"-message followed by a "tDBR"-message. In total, the sequence of the "ntBR"-message and the "tDBR"-message is continuously repeated six times after an initial occurrence starting with the fourth trace message of the trace-data stream of FIG. 9B. How loop-detection can be used to efficiently process such a trace-data stream has already been explained with reference to FIG. 7B. In the following, an embodiment of the trace-data-processing device will be described that combines loop detection with a use of series branch identifiers and series IOP identifiers.

The embodiment of the trace-data-processing device of FIG. 9B processes the trace-data stream in an identical manner as the embodiment of FIG. 9A until and including the fifth trace message. With the processing of the fifth trace message, the trace-data-processing device identifies the first recurrence of the sequence consisting of the "ntBR"-message followed by the "tDBR"-message analogously to the trace-data-processing device described with reference to FIG. 7B. As a consequence, the trace-data-processing device "replays" the determined sequence of branch identifiers "34" for all six recurrences of the sequence. In parallel, the trace-data-processing device also "replays" all determined IOP identifiers corresponding to the sequence. For the given example, those IOP identifiers are "8" and "9". The advantage of replaying the branch identifiers as well as the IOP identifiers is that no memory accesses to the sub-table "DB_LUT" have to be performed during the processing of any of the recurrences of the sequence. After the last recurrence is processed, the trace-data-processing unit uses the series branch identifiers and the series lop identifiers to determine the BIDs stored as the intermediate runtime information and any relevant IOP identifiers.

After discussing with reference to FIG. 9A and FIG. 9B how the concepts of series branch identifiers and series IOP identifiers are used by the trace-data-processing device to process a trace-data stream, in the following, a preferred implementation of the trace-data-processing device, which implement the concept of the BIDs and the IOP identifiers in two separate sub-units, will be described with reference to FIGS. 10-13.

Figure 10:
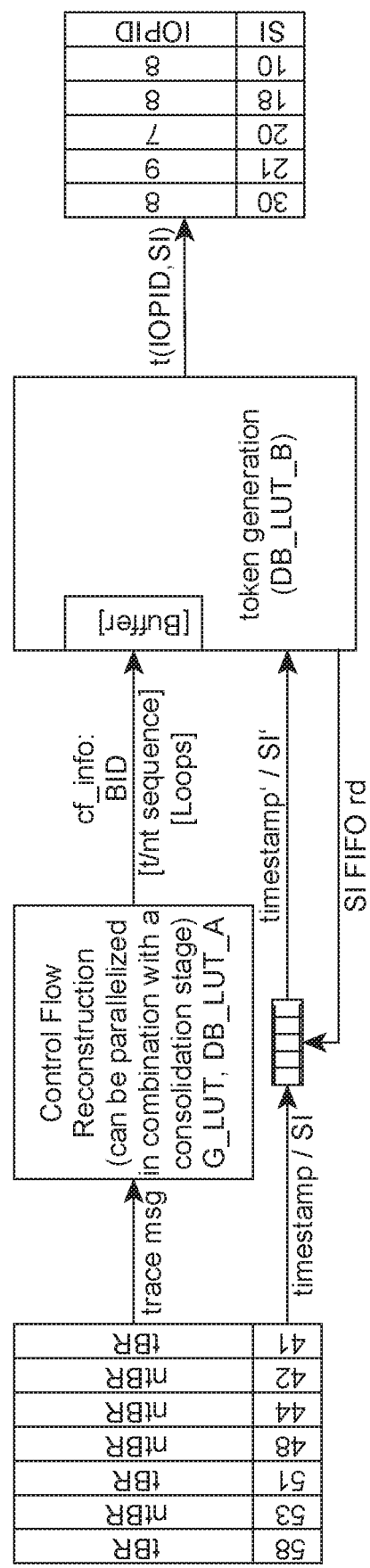
FIG. 10 is a block diagram of another embodiment of the trace-data-processing device implementing the concept of branch identifiers and IOP identifiers.

FIG. 10 is a block diagram of another embodiment of the trace-data-processing device implementing the concept of branch identifiers and IOP identifiers in two separate sub-units.

To facilitate processing of a trace-data stream in real-time, the generation of the runtime information data has to be efficient. In the embodiment of the trace-data-processing device of FIG. 10, this is achieved by separating determination of the BIDs and determination of the IOP identifiers into two separate sub-units labeled "Control Flow Reconstruction" and "token generation", respectively.

The sub-unit "Control Flow Reconstruction" performs the program flow reconstruction based on the branch identifiers. In the example shown in FIG. 12, the sub-unit "Control Flow Reconstruction" receives those trace messages of an incoming trace-data stream from the DUT 102 that correspond to instruction-synchronization messages or branch messages. From those received trace messages, the sub-unit "Control Flow Reconstruction" determines and outputs those BIDs which are to be included into the runtime information data, wherein those BIDs of branch instructions executed and non-executed are both included into the runtime information data. Moreover, if the sub-unit "Control Flow Reconstruction" detects recurrences of a loop-identifier sequence, the sub-unit "Control Flow Reconstruction" outputs the first BID of the loop-identifier sequence and the corresponding loop-message sequence of the recurrence as is indicated by a label "[tint sequence]" and "[Loops]".

In parallel to the sub-unit "Control Flow Reconstruction", the trace-data-processing device of FIG. 10 comprises a FIFO, which receives the timing information associated to the received trace messages and stores them in an order of arrival. In the example shown in FIG. 10, the timing information corresponds to a sequence indicator associated to every received trace message. The FIFO is configured to temporarily store the timing information such that in case a recurrence of a loop-identifier sequence is detected, the sub-unit "Control Flow Reconstruction" can forward the information about the recurrence in a compressed form to the sub-unit "token generation" without the timing information. Later, the timing information is read and processed by the sub-unit "token generation". In another embodiment of the trace-data-processing device, the FIFO is replaced by a memory that, in addition to the timing information itself, stores an order of arrival of the timing information. In yet another embodiment of the trace-data-processing device, which is configured to process a trace-data stream without any timing information, the FIFO is missing.

The BIDs stored as the runtime information data as well as information about recurrences of loop-identifier sequences are received by the sub-unit "token generation", which is configured to determine from the BIDs comprised in the runtime information data those IOP identifiers which correspond to instructions that were executed by the DUT 102. Additionally, the sub-unit "token generation" is configured to access the FIFO to retrieve corresponding timing information to the BIDs, which is indicated by the arrows labeled "SI FIFO rd" and "timestamp'/SI'". Using the BIDs and the corresponding timing information, the sub-unit "token generation" is configured to output each IOP identifier in form of a token that comprises the IOP identifier and the corresponding timing information. To generate the tokens, the sub-unit "token generation" is configured to follow an algorithm, which is shown in FIG. 11 and will be explained in the following.

Figure 11:
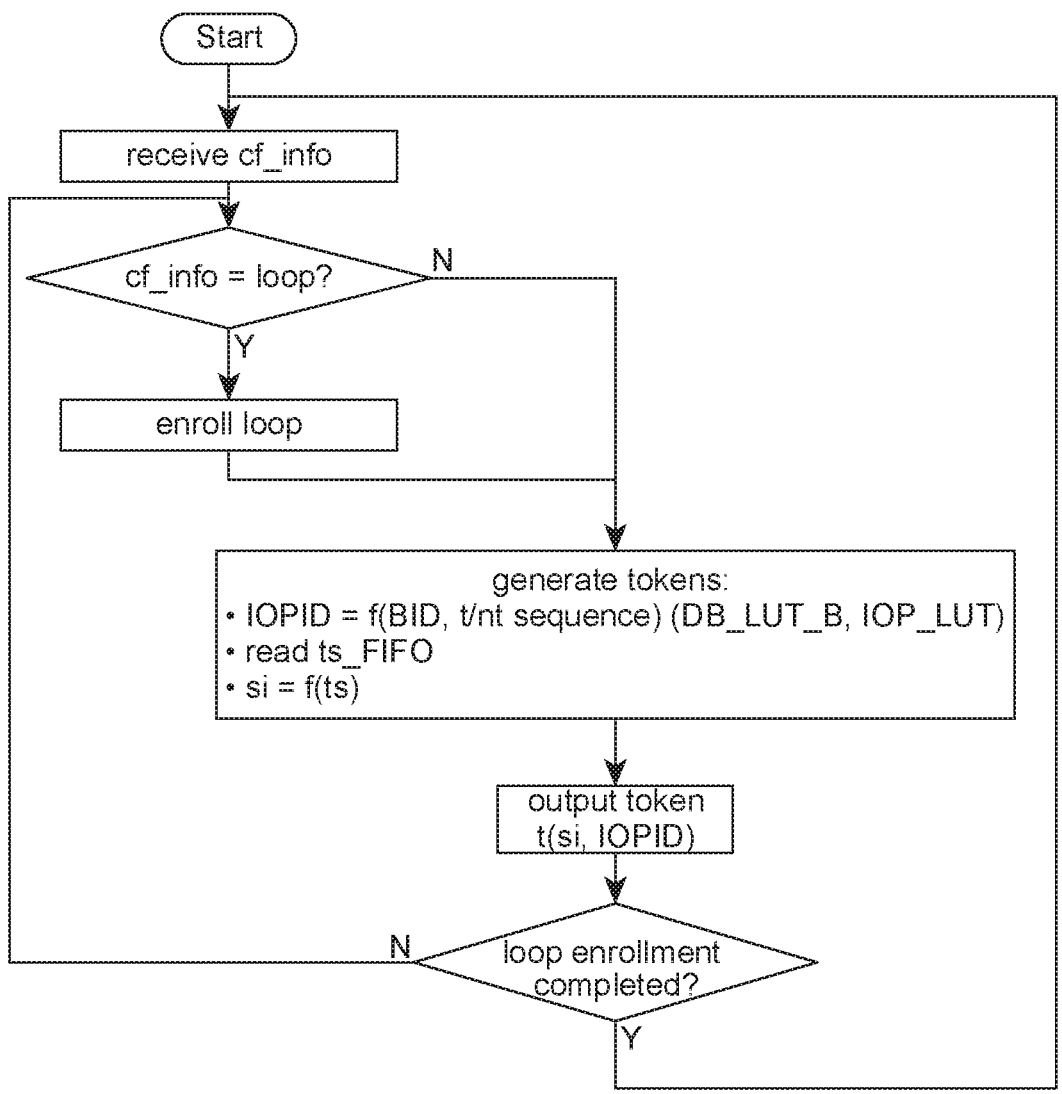
FIG. 11 is a flow chart illustrating the token generation as performed by the embodiment of the trace-data-processing device of FIG. 10.

FIG. 11 is a flow chart illustrating the token generation as performed by the embodiment of the trace-data-processing device of FIG. 10.

In a first step labeled "receive cf_info" of the flow chart of FIG. 11, the sub-unit "token generation" receives the BIDs comprised within the runtime information data and any information about recurrences of loop sequences from the sub-unit "Control Flow Reconstruction".

In a second step labeled "cf_info=loop?", the sub-unit "token generation" checks whether the information received from the sub-unit "Control Flow Reconstruction" indicate the detection of a recurrence of a loop-identifier sequence. If a recurrence of a loop-identifier sequence was detected, the loop-identifier sequence will be enrolled in a subsequent step "enroll loop" such that the entire sequence of BIDs is available to the sub-unit "token generation".

In a third step labeled "generate token", the sub-unit "token generation determines for every received BID the correspond IOP identifiers of instructions of the exemplary program that were executed by the DUT 102. Moreover, the sub-unit "token generation" determines for each BID the corresponding timing information by accessing the FIFO.

Subsequently, in a fourth step labeled "output token", the sub-unit "generate token" generates a token comprising a given IOP identifier and corresponding timing information.

In a step labeled "loop enrollment completed", the sub-unit "token generation" checks, if all recurrences have been enrolled. If not, the sub-unit "token generation" continues with the step "cf_info=loop?". Otherwise, if all recurrences of a given loop-identifier sequence have been enrolled, the sub-unit "token generation" continues with the step "receive cf_info".

To determine the relevant BIDs and IOP identifiers from the trace-data stream, the trace-data-processing device of FIG. 10 uses the reconstruction information given in FIG. 12, which will be explained in the following.

Figure 12:
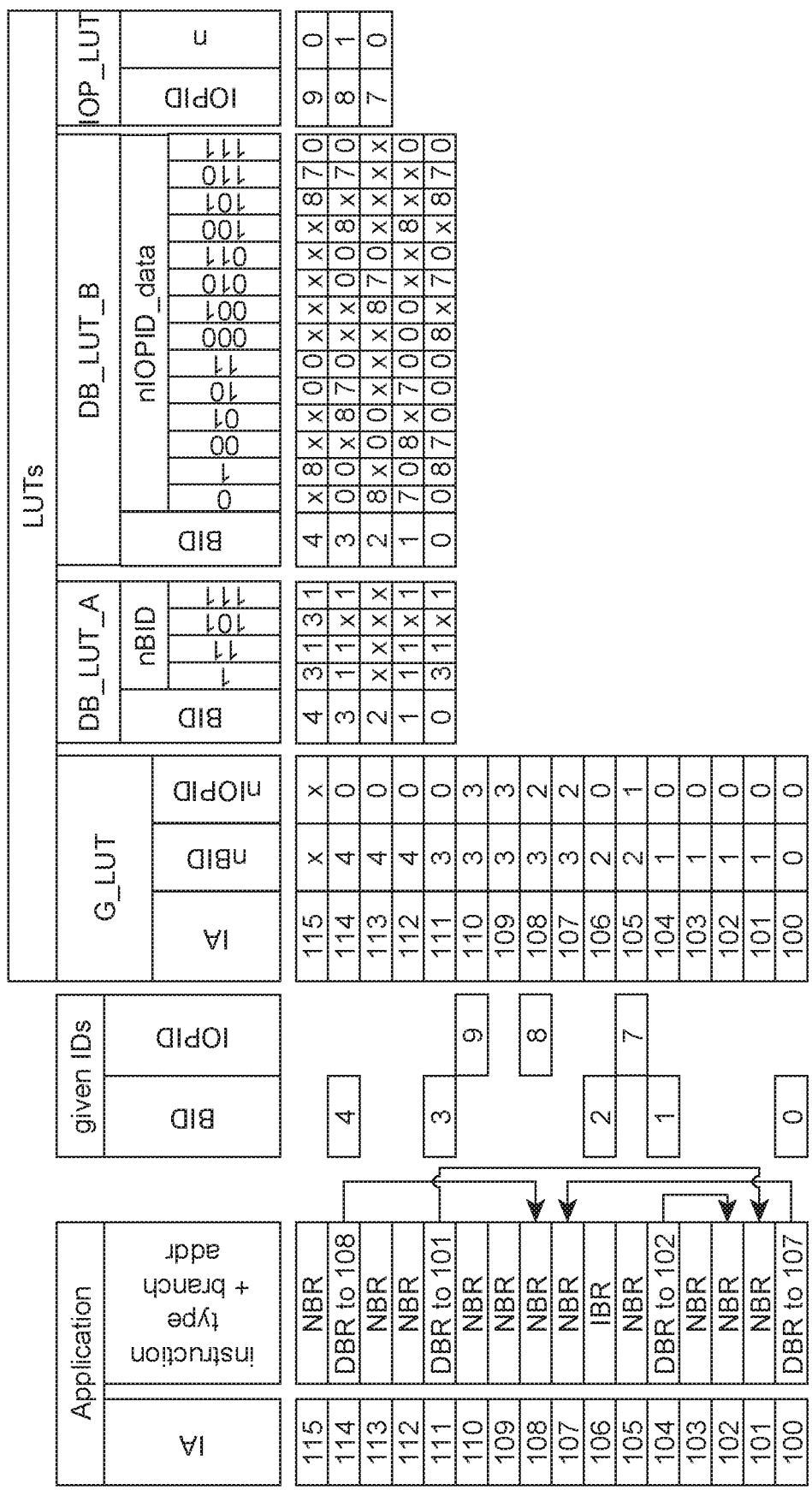
FIG. 12 shows an example for pre-stored reconstruction information stored in the reconstruction memory of the trace-data-processing device of FIG. 10.

FIG. 12 shows an example for the pre-stored reconstruction information stored in the reconstruction memory of the trace-data-processing device of FIG. 10.

In FIG. 12, a table labeled "Application", "given IDs", and "LUTs" is shown. The tables "Application" and "given IDs" are identical to those tables shown in FIG. 8-9B, which represent an exemplary program executed by the DUT 102. The table "LUTs" is a representation of the pre-stored reconstruction information stored in the reconstruction memory of the trace-data-processing device of FIG. 10, wherein the table "LUTs" of FIG. 12 differs from those of FIG. 9A and FIG. 9B in that the sub-table "DB_LUT" is split into a sub-table "DB_LUT_A" and a sub-table "DB_LUT_B". The sub-table "DB_LUT_A" comprises information about the series BIDs while the sub-table "DB_LUT_B" comprises information about the series IOP identifiers. The sub-table "DB_LUT_A" is used by the sub-unit "Control Flow Reconstruction", while the sub-table "DB_LUT_B" is used by the sub-unit "token generation". In the example given in FIG. 12, the sub-tables "G_LUT", "DB_LUT_A", and "DB_LUT_B" are small enough to be stored in an FPGA-internal memory of the trace-data-processing device of FIG. 10. However, in situations where a combined size of the sub-tables is greater than the space available in the FPGA-internal memory, the sub-table "DB_LUT_B" and the sub-table "IOP_LUT" are stored in an external memory. In the latter case, the internal memory and the external memory form sub-units of the reconstruction memory.

The separation of the determination of the BIDs and the IOP identifiers for branch messages regarding execution of a direct branch instruction or non-execution of a branch instruction is possible due to the fact that the determination of the relevant IOP identifiers is based solely on the BIDs of the executed and non-executed branch instructions included in the runtime information data. Moreover, the separation of the determination of the BIDs and the IOP identifiers into two sub-units is advantageous for increasing a processing speed with which the trace-data stream is processed by the trace-data-processing device. This increase in the processing speed results from splitting of the sub-table "DB_LUT" and storing the sub-tables "G_LUT" and "DB_LUT_A" in an internal memory of the FPGA, which generally provides shorter access times than an external memory. Moreover, the separation of the processing into two sub-units allows an efficient parallelization of the processing of the trace-data stream. While the parallelization of the determination of the relevant BIDs requires the trace-data stream to be split into parts that each start with an instruction-synchronization message, the relevant IOP identifiers can be determined for each BID given in the runtime information data separately.

This difference can be efficiently taken into account when the determination of the relevant BIDs and IOP identifiers is performed in the described separate sub-units.

In another embodiment of the trace-data-processing device of FIG. 10, the pre-stored reconstruction information stored in the reconstruction memory are further adapted to increase the processing speed of the trace-data stream. These modifications will be explained with reference to FIG. 13.

Figure 13:
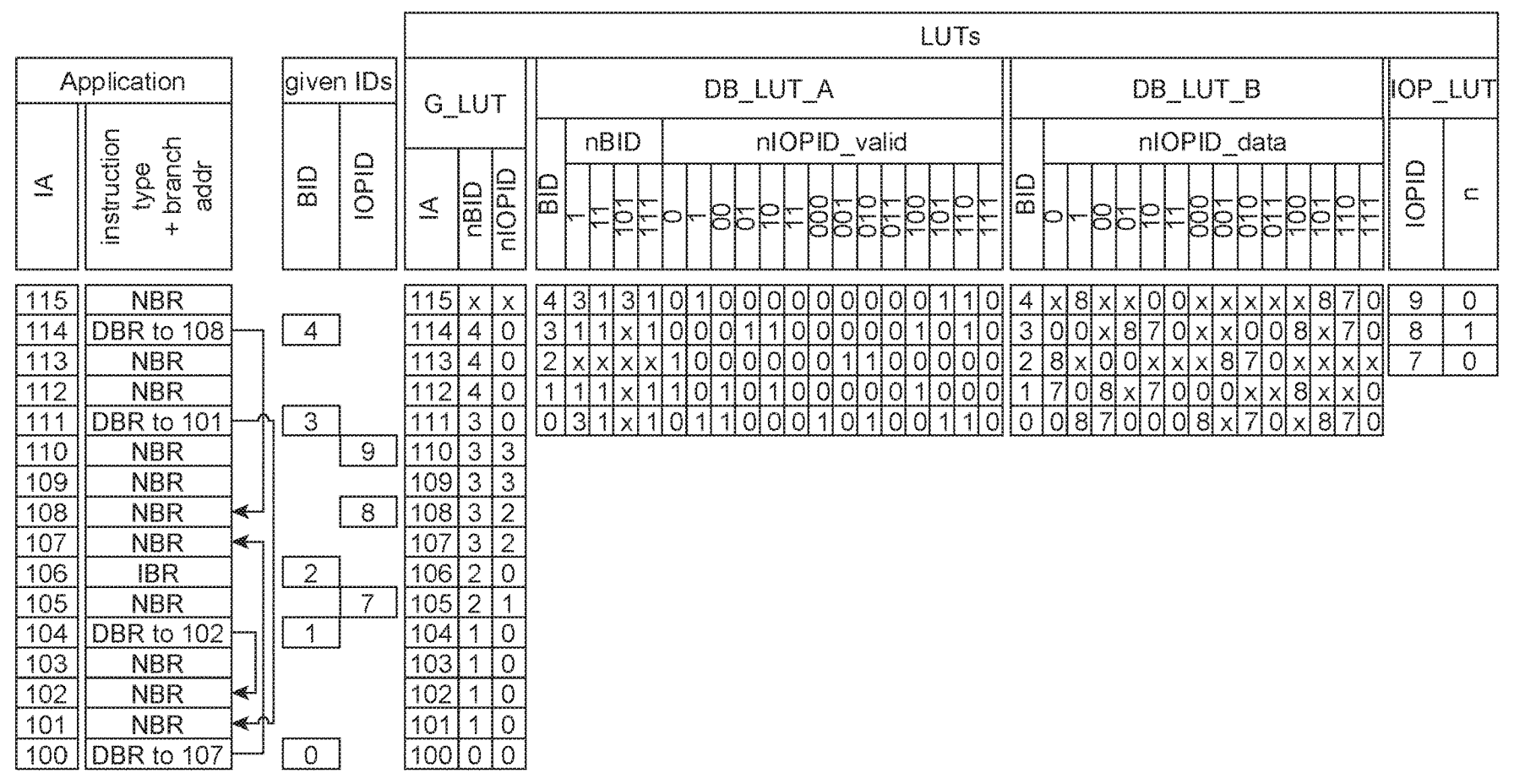

FIG. 13 shows another example for pre-stored reconstruction information stored in the reconstruction memory of the trace-data-processing device of FIG. 10.

In FIG. 12, a table labeled "Application", "given IDs", and "LUTs" is shown. The tables "Application" and "given IDs" are identical to those tables shown in FIG. 8-9B and FIG. 12, which represent an exemplary program executed by the DUT 102. The table "LUTs" is a representation of the pre-stored reconstruction information stored in the reconstruction memory of the trace-data-processing device of FIG. 10, wherein the table "LUTs" of FIG. 13 differs from that of FIG. 12 in that the sub-table "DB_LUT_A" comprises an additional column labeled "nIOPID_valid".

The column "nIOPID_valid" is based on the column "nIOPID" of sub-table "DB_LUT_B" of FIG. 12, however, the numerical values identifying the different series IOP identifiers and the symbol "x" identifying undetermined series IOP identifiers are replaced by "1" and "0", respectively. The column "nIOPID_valid" can be included into the FPGA-internal memory together with the other parts of sub-table "DB_LUT_A", due to a reduction in size in comparison to the sub-table "DB_LUT_B" as a result of the limitation to binary values.

The column "nIOPID_valid" serves as an additional lookup table for the sub-unit "generate token" to limit the access to the FPGA-external memory. Due to the indirect branch instruction comprised in a program, a large number of series IOP identifiers are undetermined. By using the column "nIOPID_valid", a read access to the sub-table "DB_LUT_B" only has to be performed for those series IOP identifiers that are associated with a "1" in the column "nIOPID_valid". Thus, using the table "LUTs" of FIG. 13 provides a further means to speed up the processing of the trace-data stream.

In yet another implementation, which is not shown, the column "nIOPID_data" comprises for each series IOP identifier an additional field, which indicates the value of the column "n" of the sub-table "IOP_LUT". This further reduces the number of times that a read access to the FPGA-external memory is required since a single access to the modified column "nIOPID_data" replaces two separate accesses to the column "nIOPID_data" and sub-table "IOP_LUT".

After different embodiments of the first aspect of the invention have been described with reference to FIGS. 1-13, in the following, an embodiment of the second aspect of the invention will be described with reference to FIG. 14.

Figure 14:
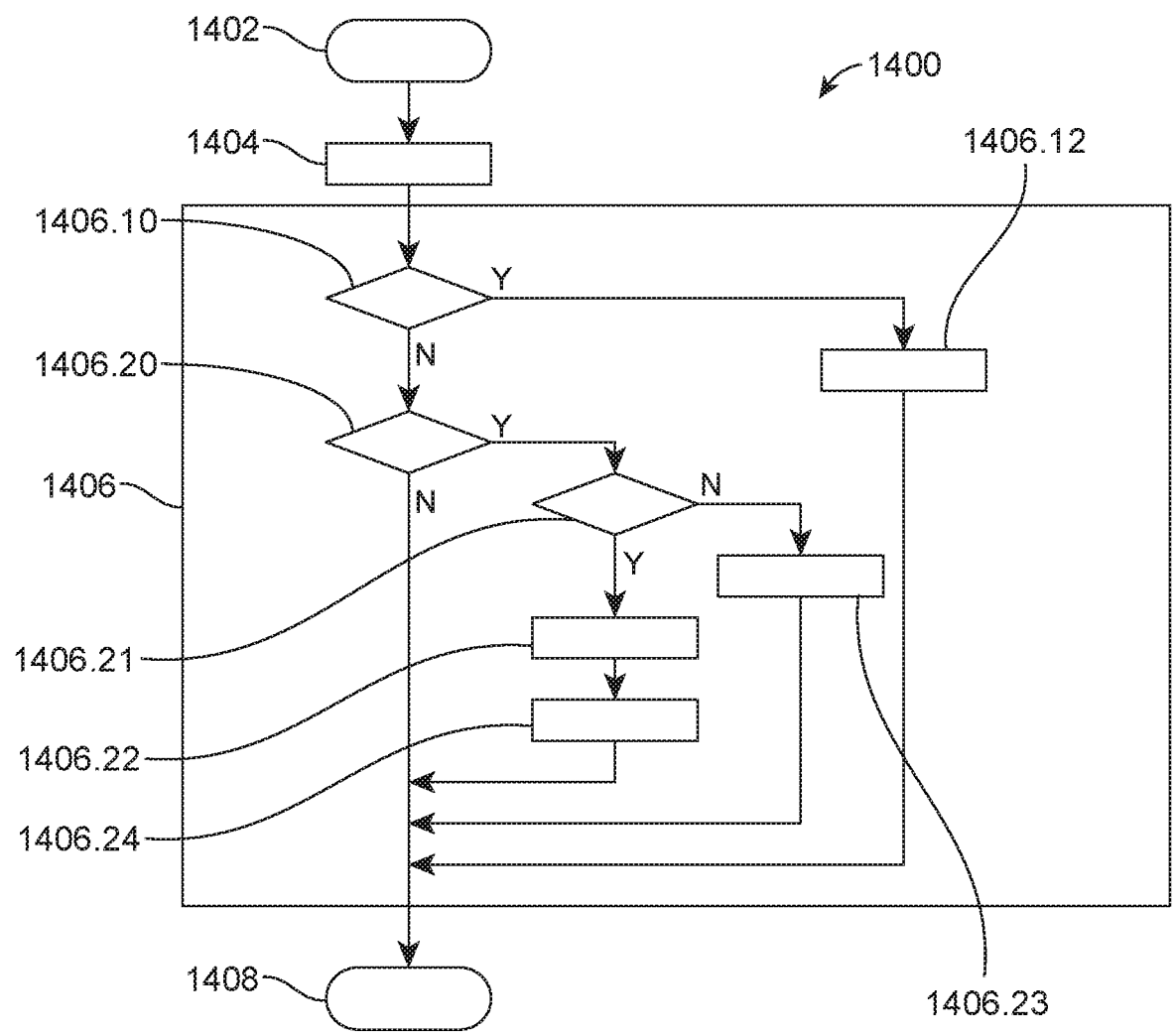
FIG. 14 is a flow diagram of a trace-data-processing method for reconstructing an execution flow of a program performed by a source device under test or under observation.

FIG. 14 is a flow diagram a trace-data-processing method 1400 for reconstructing an execution flow of a program performed by a source device under test or under observation.

The method comprises a plurality of steps and starts with a step 1402. In a step 1404, a type of an incoming trace message of the at least one source-specific trace-data stream is identified. The step 1404 comprises identifying two types of messages in the trace-data stream:

instruction-synchronization message indicative of an instruction address of an instruction executed by the DUT, and branch messages comprising information about an execution of a branch instruction by the DUT.

In a step 1406, runtime-information data indicative of an at least partial reconstruction of the execution flow is generated. The runtime-information data is generated using
  the identified at least one instruction-synchronization message and the identified branch messages,
  a pre-defined branch identifier allocated to each branch instruction address in the program that is associated with a direct branch instruction, wherein the branch identifiers are in an order corresponding to an execution direction of the program, and using
  pre-stored reconstruction information stored in a reconstruction memory.

The pre-stored reconstruction information includes
  (i) address-allocation information that allocates a next branch identifier to each instruction address of the program, wherein the next branch identifier is that branch identifier whose branch instruction address is closest, in the execution direction, to an instruction address under consideration, or directly at the instruction address under consideration, and
  (ii) branch-identifier-allocation information that allocates to each branch identifier a subsequent branch identifier, wherein the subsequent branch identifier is that branch identifier whose branch instruction address is closest, in the execution direction, to a jump-in address associated with a branch instruction of a branch identifier under consideration, or is directly at the jump-in address.

The step 1406 for generating the runtime-information data comprises the following steps:

In a step 1406.10, it is determined, if the incoming trace message was identified in step 1404 as a synchronization message. Upon identification of a synchronization message, a step 1406.12 is executed.

In the step 1406.12, that next branch identifier which corresponds to the instruction address comprised by the synchronization message according to the address-allocation information is stored as an intermediate runtime information.

After the execution of the step 1406.12, the execution of the method continues with a step 1408.

If in step 1406.10, the incoming trace message was determined not to be an instruction-synchronization message, the method continues with a step 1406.20.

In the step 1406.20, it is determined, if the incoming trace message was identified in the step 1404 as a branch message. Upon identification of a branch message, a step 1406.21 is executed, which determines, if the branch message indicates execution of a branch instruction. If the branch message indicates execution of a branch instruction, a step 1406.22 and a step 1406.24 are executed.

In the step 1406.22, the branch identifier stored as the intermediate runtime information is included into the runtime information data.

In the step 1406.24, the intermediate runtime information is subsequently overwritten with that subsequent branch identifier which is allocated to the stored branch identifier according to the branch-identifier-allocation information.

After the step 1406.24 is executed, the method continues with the step 1408.

If in the step 1406.21, it was determined that the incoming trace message was identified as a branch message and that this branch message indicates that a branch instruction was not executed, a step 1406.23 is executed.

In the step 1406.23, the intermediate runtime information is updated by adding a predetermined increment to the intermediate runtime information. Subsequently, the method continues with the step 1408.

The step 1408 marks the end of the method. The method is repeated for every incoming trace message.

The order of the steps in the method shown in FIG. 14 is non-limiting. The steps can also be executed in a different order. In variants of the described method, the step 1404 is split into two steps, wherein one step identifies the instruction-synchronization message in the trace-data stream whereas the second step identifies branch messages within the trace-data stream.

Likewise, in other variants of the described method, the step 1406 is split into two steps, wherein the first step generates runtime-information data, including the generation of intermediate runtime information, in response to the identification of an instruction-synchronization message. Whereas the second step generates runtime-information data, including the generation of intermediate runtime information, in response to the identification of a branch message.

In summary, the invention relates to a trace-data-processing device for reconstructing an execution flow of a program performed by a source device under test or under observation, herein DUT, using at least one source-specific trace-data stream. The trace-data-processing device comprises a trace-data-processing unit, which is configured to identify in the trace-data stream at least one instruction-synchronization message and branch messages. Moreover, the trace-data-processing device is configured to generate runtime-information data indicative of an at least partial reconstruction of the execution flow, using the identified trace messages, a pre-defined branch identifier allocated to each branch instruction address in the program that is associated with a direct branch instruction and pre-stored reconstruction information stored in a reconstruction memory.

The invention claimed is:

1. A trace-data-processing device for reconstructing an execution flow of a program performed by a source device under test or under observation, herein DUT, using at least one source-specific trace-data stream, wherein the trace-data-processing device comprises:
 a trace-data-processing unit, which is configured to:
  identify in the at least one source-specific trace-data stream:
   at least one instruction-synchronization message indicative of an instruction address of an instruction executed by the DUT, and
   branch messages comprising information about an execution of a branch instruction by the DUT; and
  generate runtime-information data indicative of an at least partial reconstruction of the execution flow, using:
   the identified at least one instruction-synchronization message and the identified branch messages,
   a pre-defined branch identifier allocated to each branch instruction address in the program that is associated with a direct branch instruction, wherein the pre-defined branch identifiers are in an order corresponding to an execution direction of the program, and
   pre-stored reconstruction information stored in a reconstruction memory, which includes:
   (i) address-allocation information that allocates a next pre-defined branch identifier to each instruction address of the program, wherein the next pre-defined branch identifier is that pre-defined branch identifier whose branch instruction address is closest, in the execution direction, to an instruction address under consideration, or directly at the instruction address under consideration; and
   (ii) branch-identifier-allocation information that allocates to each pre-defined branch identifier a subsequent pre-defined branch identifier, wherein the subsequent pre-defined branch identifier is that pre-defined branch identifier whose branch instruction address is closest, in the execution direction, to a jump-in address associated with a branch instruction of a pre-defined branch identifier under consideration, or is directly at the jump-in address; and
  wherein the trace-data-processing unit is configured:
   upon identification of the at least one instruction-synchronization message, to store as an intermediate runtime information that next pre-defined branch identifier which corresponds to the instruction address comprised by the at least one instruction-synchronization message according to the address-allocation information; and
   upon identification of a given branch message that indicates that a direct branch instruction was executed,
    (i) to include into the runtime-information data the branch identifier stored as the intermediate runtime information, and
    (ii) to subsequently overwrite the intermediate runtime information with that subsequent pre-defined branch identifier which is allocated to the stored pre-defined branch identifier according to the branch-identifier-allocation information; and
   upon identification of a given branch message that indicates that a branch instruction was not executed, to update the intermediate runtime information by adding a predetermined increment to a value of the intermediate runtime information.

2. The trace-data-processing device of claim 1, wherein the trace-data-processing unit is configured to generate runtime-information data using the pre-defined branch identifiers, wherein a pre-defined branch identifier is also allocated to each of those branch instruction addresses in the program that are associated with an indirect branch instruction; and wherein the trace-data-processing unit is additionally configured,
 upon identification of a branch message that indicates that an indirect branch instruction was executed,
  (i) to include into the runtime-information data the pre-defined branch identifier stored as the intermediate runtime information, and
  (ii) to subsequently overwrite the intermediate runtime information with that next pre-defined branch identifier which is allocated to the jump-in address indicated by the branch message according to the address-allocation information.

3. The trace-data-processing device of claim 1, wherein the trace-data-processing unit is configured, upon reception of a branch message that indicates that a branch instruction was not executed, to include into the runtime-information data the pre-defined branch identifier stored as the intermediate runtime information.

4. The trace-data-processing device of claim 1, wherein the trace-data-processing unit is configured, upon reception of a branch message, to include into the runtime-information a time information associated with the processing of the branch message by the trace-data-processing unit.

5. The trace-data-processing device of claim 1, wherein the trace-data-processing unit is configured to output the jump-in address of the branch instruction of the stored pre-defined branch identifier, upon reception of a branch message indicating that a branch instruction was executed.

6. The trace-data-processing device of claim 1, wherein:
the branch-identifier-allocation information includes marks for distinguishing those of the pre-defined branch identifiers which are to be included into the runtime-information data from those of the pre-defined branch identifiers which are not to be included into the runtime-information data; and
the trace-data-processing unit is configured, upon identification of a branch message that indicates execution or non-execution of a branch instruction, to include into the runtime-information data only those pre-defined branch identifiers stored in the intermediate runtime information that are marked for inclusion into the runtime-information data.

7. The trace-data-processing device of claim 1, wherein the branch-identifier-allocation information of the trace-data-processing unit additionally allocates to a pre-defined branch identifier under consideration
for each sequence of a set of sequences of execution information elements indicative of execution or non-execution of corresponding direct branch instructions, the sequences starting from the pre-defined branch identifier under consideration and ending at a respective final pre-defined branch identifier, wherein
the set includes at least those sequences, up to a given length, whose first and last execution information element in the sequence indicate execution of the corresponding branch instruction,
a series pre-defined branch identifier, which is that pre-defined branch identifier whose branch instruction address is closest to, in the execution direction, or directly at the jump-in address of the final pre-defined branch identifier; and wherein
the trace-data-processing unit is configured, upon identification of a sequence of branch messages indicative of execution or non-execution of direct branch instructions, to include into the runtime-information, using the branch-identifier-allocation information those pre-defined branch identifiers whose direct branch instructions were executed by the DUT.

8. The trace-data-processing device of claim 1, wherein the trace-data-processing unit is configured to generate the runtime-information data additionally using
in the program whose execution is to be monitored by the trace-data-processing unit; wherein:
the address-allocation information additionally allocates a next instruction-observation-point (IOP) identifier to each instruction address, wherein the next IOP identifier is that IOP identifier, if any, whose instruction address is located closest to or directly at an instruction address under consideration and whose instruction address is located in an interval between the instruction address under consideration and a branch instruction address located closest to the instruction address under consideration, in the execution direction; and
the branch-identifier-allocation information additionally allocates to each pre-defined branch identifier a first subsequent IOP identifier, which is that IOP identifier, if any, whose instruction address is located closest to or directly at a branch instruction address of a pre-defined branch identifier under consideration and whose instruction address is located in an interval between the branch instruction address of the pre-defined branch identifier under consideration and a branch instruction address located closest to the branch instruction address of the pre-defined branch identifier under consideration, in the execution direction; and
the branch-identifier-allocation information additionally allocates to each pre-defined branch identifier a second subsequent IOP identifier, which is that IOP identifier, if any, whose instruction address is located closest to or directly at a jump-in address of a pre-defined branch identifier under consideration and whose instruction address is located in an interval between the jump-in address of the pre-defined branch identifier under consideration and a branch instruction address located closest to the jump-in address of the pre-defined branch identifier under consideration, in the execution direction; and
the pre-stored reconstruction information additionally includes
IOP-allocation information that indicates for a given IOP identifier any following IOP identifier, whose instruction address is located in an interval between the instruction address of the IOP identifier under consideration and a branch instruction address located closest to the instruction address of the IOP identifier under consideration, in the execution direction; and wherein
the trace-data-processing unit is configured:
upon identification of an instruction-synchronization message, to determine, using the address-allocation information and the IOP-allocation information, those IOP identifiers, if any, whose associated instructions are to be executed by the DUT before execution or non-execution of a next branch instruction in the program execution flow, and to include the determined IOP identifiers into the intermediate runtime information; and
upon reception of a branch message indicating execution or non-execution of a direct branch instruction, to include into the runtime-information data any IOP identifier comprised in the intermediate runtime information and to determine, using the branch-identifier-allocation information and the IOP allocation, those IOP identifiers, if any, whose associated instructions are to be executed by the DUT before execution or non-execution of a next branch instruction in the program execution flow, and to include the determined IOP identifiers into the intermediate runtime information.

9. The trace-data-processing device of claim 7, wherein the branch-identifier-allocation information additionally allocates to a pre-defined branch identifier under consideration
for the sets of sequences of execution information elements indicative of execution or non-execution of a corresponding direct branch instructions, starting from the pre-defined branch identifier under consideration and ending at a respective final pre-defined branch identifier,
a series instruction-observation-point (IOP) identifier, which is that IOP identifier whose instruction address,
(i) in case of execution of the branch instruction of the final pre-defined branch identifier, is located closest to, in the execution direction, or directly at a jump-in address of the branch instruction of the final pre-defined branch identifier, and is located in an interval between the jump-in address and a branch instruction address located closest to the jump-in address of the final pre-defined branch identifier in the execution direction; and (ii) in case of non-execution of the branch instruction of the final pre-defined branch identifier, is located closest to in the execution direction or directly at the branch instruction address of the final pre-defined branch identifier, and is located in an interval between the branch instruction address of the final pre-defined branch identifier and a branch instruction address located closest to the branch instruction address of the final pre-defined branch identifier in the execution direction; and wherein the trace-data-processing unit is configured, upon identification of a sequence of branch messages indicative of execution or non-execution of direct branch instructions, to include into the runtime-information, using the branch-identifier-allocation information and the IOP-identifier allocation, those IOP identifiers whose instructions were executed by the DUT.

10. The trace-data-processing device of claim 8, wherein the trace-data-processing unit is additionally configured,
upon reception of a branch message indicating execution or non-execution of an indirect branch instruction, to determine, using the branch-identifier-allocation information and the IOP-allocation information, those IOP identifiers, if any, whose associated instructions were executed by the DUT, and to include the determined IOP identifiers into the runtime-information data.

11. The trace-data-processing device of claim 1, wherein:
the values of the pre-defined branch identifiers are integers, wherein the values of branch identifiers of neighboring branch instructions differ by 1; and
the value of the predetermined increment is 1.

12. The trace-data-processing device of claim 1, wherein the trace-data-processing device comprises a token-generation unit, which is configured to generate and output a token comprising at least a part of the runtime-information data.

13. A trace-data-processing device of claim 1, wherein the trace-data-processing unit is configured:
to identify within the at least one source-specific trace-data stream any two consecutive sequences of direct branch messages that
(i) comprise an identical sequence of branch messages, referred to as a loop-message sequence, indicative of execution or non-execution of direct branch instructions; and that
(ii) produce an identical sequence of pre-defined branch identifiers, referred to as a loop-identifier sequence; and
upon identification of a loop-message sequence, to store the corresponding loop-identifier sequence; and
to determine the sequence of pre-defined branch identifiers of any loop-messages that consecutively follow the two identified loop-message sequences using the stored loop-identifier sequence.

14. A trace-data-processing method for reconstructing an execution flow of a program performed by a source device under test or under observation, herein DUT, using at least one source-specific trace-data stream, the method comprising:
identifying in the at least one source-specific trace-data stream:
at least one instruction-synchronization message indicative of an instruction address of an instruction executed by the DUT, and
branch messages comprising information about an execution of a branch instruction by the DUT;
generating runtime-information data indicative of an at least partial reconstruction of the execution flow, using:
the identified at least one instruction-synchronization message and the identified branch messages,
a pre-defined branch identifier allocated to each branch instruction address in the program that is associated with a direct branch instruction, wherein the pre-defined branch identifiers are in an order corresponding to an execution direction of the program, and
pre-stored reconstruction information stored in a reconstruction memory, which includes:
(i) address-allocation information that allocates a next pre-defined branch identifier to each instruction address of the program, wherein the next pre-defined branch identifier is that pre-defined branch identifier whose branch instruction address is closest, in the execution direction, to an instruction address under consideration, or directly at the instruction address under consideration; and
(ii) branch-identifier-allocation information that allocates to each branch identifier a subsequent pre-defined branch identifier, wherein the subsequent branch identifier is that pre-defined branch identifier whose branch instruction address is closest, in the execution direction, to a jump-in address associated with a branch instruction of a pre-defined branch identifier under consideration, or is directly at the jump-in address;
wherein generating the runtime-information data comprises:
upon identification of the at least one instruction-synchronization message, storing as an intermediate runtime information that next pre-defined branch identifier which corresponds to the instruction address comprised by the at least one instruction-synchronization message according to the address-allocation information; and
upon identification of a given branch message that indicates that a direct branch instruction was executed,
(i) including into the runtime-information data the pre-defined branch identifier stored as the intermediate runtime information, and
(ii) subsequently overwriting the intermediate runtime information with that subsequent pre-defined branch identifier which is allocated to the stored pre-defined branch identifier according to the branch-identifier-allocation information; and
upon identification of a given branch message that indicates that a branch instruction was not executed, updating the intermediate runtime information by adding a predetermined increment to a value of the intermediate runtime information.

15. A computer program comprising instructions which, when the program is executed by a computer, cause the computer to carry out the steps of the method of claim 14.

* * * * *